(12) United States Patent
Miyazawa

(10) Patent No.: US 8,656,184 B2
(45) Date of Patent: Feb. 18, 2014

(54) INSTALLATION OF APPLICATION PACKAGE PACKAGING PLURAL APPLICATIONS

(75) Inventor: Hiroyasu Miyazawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 443 days.

(21) Appl. No.: 12/721,255

(22) Filed: Mar. 10, 2010

(65) Prior Publication Data

US 2010/0241873 A1 Sep. 23, 2010

(30) Foreign Application Priority Data

Mar. 19, 2009 (JP) ................................. 2009-068163

(51) Int. Cl.
*H04L 29/06* (2006.01)
*G06F 21/10* (2013.01)

(52) U.S. Cl.
CPC ...................................... *G06F 21/10* (2013.01)
USPC ........................................................ 713/191

(58) Field of Classification Search
USPC ........ 717/168–174; 713/150–194; 380/45–21
See application file for complete search history.

(56) References Cited

U.S. PATENT DOCUMENTS

| | | | | |
|---|---|---|---|---|
| 2003/0220883 A1* | 11/2003 | Block et al. | ...................... | 705/59 |
| 2004/0039916 A1* | 2/2004 | Aldis et al. | .................... | 713/177 |
| 2004/0168165 A1* | 8/2004 | Kokkinen | ...................... | 717/168 |
| 2005/0050315 A1* | 3/2005 | Burkhardt et al. | ............ | 713/150 |
| 2005/0132179 A1* | 6/2005 | Glaum et al. | ..................... | 713/1 |
| 2006/0075253 A1* | 4/2006 | Sonkin et al. | ................. | 713/183 |
| 2006/0294372 A1* | 12/2006 | Maxa et al. | ..................... | 713/165 |
| 2008/0222043 A1* | 9/2008 | Chefalas et al. | ................ | 705/59 |
| 2008/0228513 A1* | 9/2008 | McMillan et al. | ................. | 705/1 |
| 2009/0122982 A1* | 5/2009 | Abrams et al. | ..................... | 380/45 |
| 2009/0260003 A1* | 10/2009 | Matsugashita | ................ | 717/174 |
| 2009/0268235 A1* | 10/2009 | Lee | ............................. | 358/1.15 |
| 2010/0279674 A1* | 11/2010 | Zou et al. | ...................... | 455/419 |

FOREIGN PATENT DOCUMENTS

| | | |
|---|---|---|
| JP | 2006-163896 | 6/2006 |
| JP | 2006-260163 | 9/2006 |

OTHER PUBLICATIONS

Japanese Office Action dated Mar. 19, 2013 issued during prosecution of related Japanese application No. 2009-068163.

* cited by examiner

*Primary Examiner* — Chau Le
*Assistant Examiner* — Don Zhao
(74) *Attorney, Agent, or Firm* — Fitzpatrick, Cella, Harper & Scinto

(57) ABSTRACT

An application packaging device is provided, which comprises a decryption component configured to decrypt each of a plurality of applications, a replication component configured to replicate an end user license agreement included in each of the plurality of decrypted applications, and a component configured to package respective replicas of the end user license agreements and the plurality of applications before the decryption so as to obtain an application package.

3 Claims, 32 Drawing Sheets

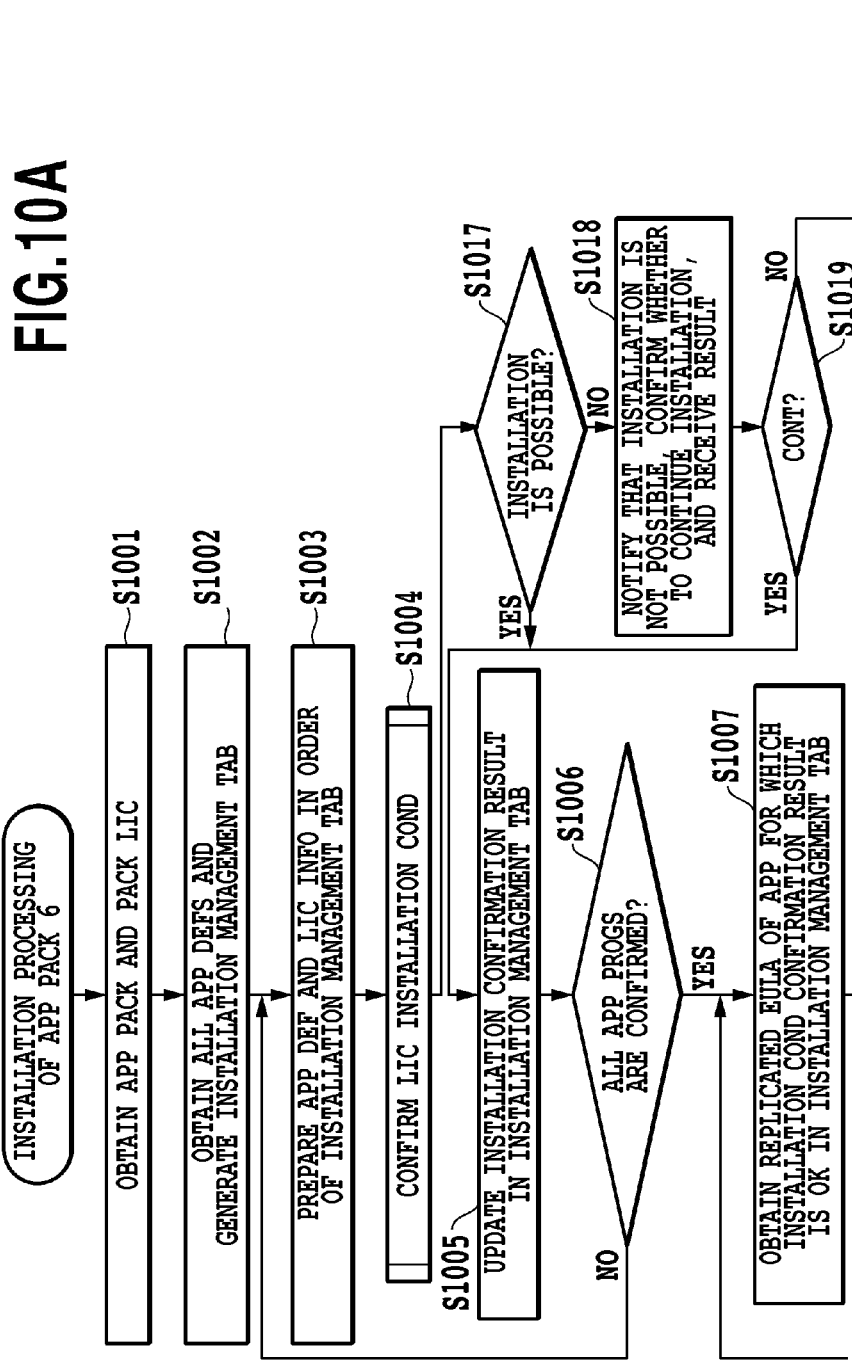

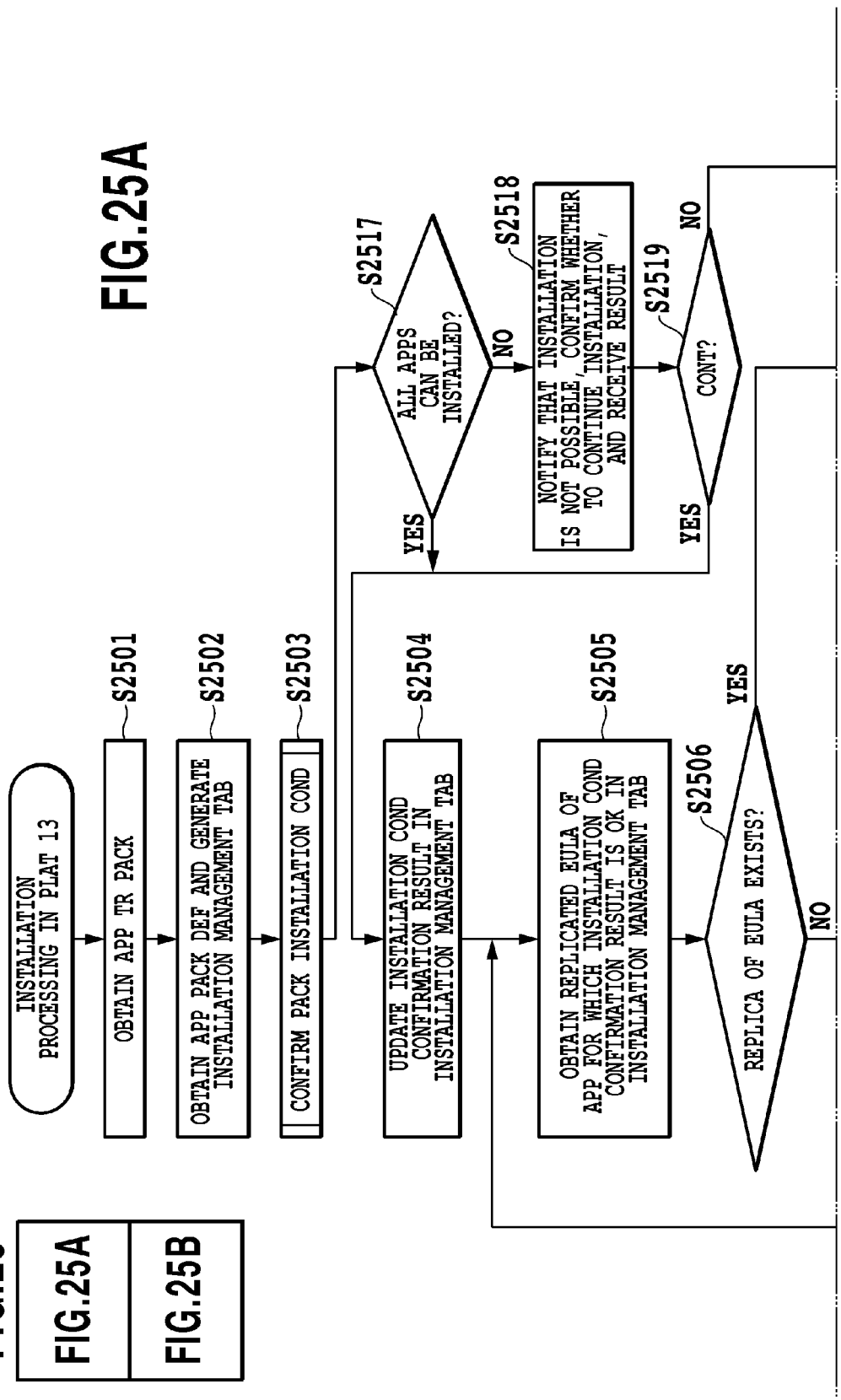

FIG.28

| FIG.28A |
|---------|
| FIG.28B |

FIG.28A

REPACKAGING PROCESSING IN PLAT 13

↓ S2801
OBTAIN SELECTED APP DEF

↓ S2802
DEVELOP APP DEF CORRESPONDING TO APP ID

↓ S2803
PRESERVATION LOCATION IS IMAGE FORMING DEVICE? —NO→
│ YES
↓ S2804
INSTALLATION-ACCEPTING PLAT? —NO→ S2831 NOT UNINSTALL? —YES→
│ YES
↓ S2805
REGENERATE APP PROG

↓ S2806
CONFIG EXISTS? —NO→
│ YES
↓ S2807
(1)COPY CONFIG

↓ S2809
PREF EXISTS? —YES→

INSTALLATION OF APPLICATION PACKAGE PACKAGING PLURAL APPLICATIONS

BACKGROUND OF THE INVENTION

1. Field of the Invention

The present invention relates to an application packaging device packaging plural applications, a control method thereof and a program.

2. Description of the Related Art

Conventionally, a concept of license is introduced for the copyright protection of an application. Usually, one license is assigned to one application, and the application can be installed by the input of the license at the start of the application installation.

Meanwhile, there is known a method of archiving a plurality of applications into one application package and installing the applications at a time.

However, in the installation of the application package in which licenses are set for respective applications, it is necessary to input a license for each application installation and the installation becomes complicated.

Accordingly, Japanese Patent Laid-Open No. 2006-163896 proposes a method in which a license includes license data specifying a plurality of applications in an application package and data proving the validity of the license data for the whole application package. By this method, it is possible to carry out the license input at a time when installing an application package in which a license is set for each application.

In the method of the above patent publication, the installation of the application package is easy because the license is input only once at the start of the installation. However, an item required to be input during the installation is not only the license.

For example, there is an article of agreement, called EULA (End User License Agreement), which describes licensing contents to be accepted for the installation. A user needs to input the acceptance of the licensing contents for continuing the installation.

Further, for example, there is a case in which an application specific installation condition (e.g., installation-accepting platform version, minimum required resource, etc.) is set. In this case, it is notified during the installation process that an application cannot be installed because the installation condition is not satisfied, and it is necessary to input whether to continue the installation or not.

In the method of the above patent publication, the application package simply packages a plurality of applications, and the installation is carried out for each of the applications. Accordingly, it is sometimes notified that the installation condition is not satisfied at the start timing of each application installation, and an input whether to continue the installation or not is sometimes required or an input for the acceptance of the license contents is sometimes required. As a result, the installation becomes complicated and there is a possibility that inquiry to a user occurs many times during the installation, for example.

SUMMARY OF THE INVENTION

An object of the present invention is to provide an application package generation method and an installation method thereof capable of simplifying the installation, and also to enable re-installation of the application package thus generated to be carried out easily.

In accordance with an aspect of the present invention, there is provided an application packaging device which comprises a decryption component configured to decrypt each of a plurality of applications, a replication component configured to replicate an end user license agreement included in each of the plurality of decrypted applications, and a component configured to package respective replicas of the end user license agreements and the plurality of applications before the decryption so as to obtain an application package.

Alternatively, there is provided an application packaging device which comprises an application package generation component configured to decrypt each of a plurality of applications and to generate an application package including an end user license agreement included in each of the plurality of decrypted applications in a region different from that for the plurality of applications before the decryption.

Alternatively, there is provided an application packaging device which comprises a component configured to reconfigure each application according to an application definition within an application package in response to a transfer instruction, in a device having a plurality of packaged applications installed, a component configured to uninstall the application provided with the transfer instruction, from the device, a component configured to extract information related to the application according to the application definition, a component configured to associate the reconfigured application with the extracted information, and an application transfer package generation component configured to generate one package in which the association is provided to each of the plurality of applications.

Alternatively, there is provided an application packaging device which comprises a component configured to reconfigure each application according to an application definition, within an application package in response to a transfer instruction, in a device having a plurality of packaged applications installed, a component configured to uninstall the application provided with the transfer instruction, from the device, a component configured to extract information related to the application according to the application definition, a component configured to associate the reconfigured application with the extracted information, a component configured to generate an application package definition from the respective application definitions of the plurality of applications, and an application transfer package generation component configured to generate and preserve one package in which the association is provided to each of the plurality of applications, separately from the application package definition.

According to the present invention, in the application package installation processing, it becomes possible to carry out input jobs, which occur otherwise at the start timings of installation for respective applications, at the same time when starting the package installation. The input jobs include acceptance of an end user license agreement and an input job to continue the installation, etc.

Hereinafter, embodiments for implementing the present invention will be described referring to the accompanying drawings.

Further features of the present invention will become apparent from the following description of exemplary embodiments (with reference to the attached drawings).

BRIEF DESCRIPTION OF THE DRAWINGS

FIG. 10 is a diagram showing the relationship between FIG. 10A and FIG. 10B. FIG. 10A shows a top view of a flowchart of application package installation processing according to the present invention and FIG. 10B shows a bottom view of the flowchart;

FIG. 15 is a diagram showing the relationship between FIG. 15A and FIG. 15B.

FIG. 25 is a diagram showing the relationship between FIG. 25A and FIG. 25B. FIG. 25A shows a top view of a flowchart of re-installation processing according to the present invention and FIG. 25B shows a bottom view of the flowchart;

FIG. 28 is a diagram showing the relationship between FIG. 28A and FIG. 28B. FIG. 28A shows a top view of a flowchart of different re-packaging processing according to the present invention and FIG. 28B shows a bottom view of the flowchart.

DESCRIPTION OF THE EMBODIMENTS (First Embodiment)
*Image Forming Apparatus 1

Figure 1:
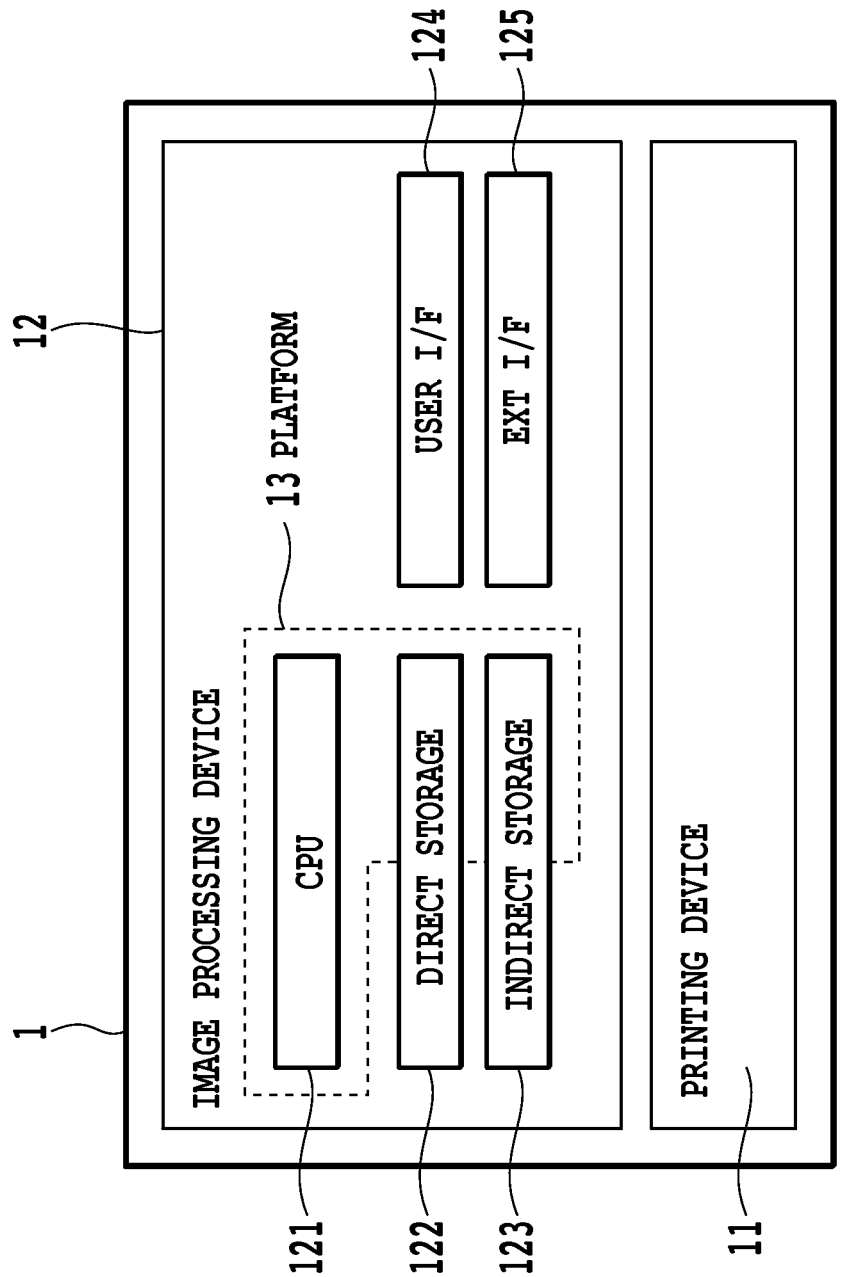
FIG. 1 is a block diagram showing a configuration of an image forming apparatus capable of implementing the present invention.

FIG. 1 is a block diagram showing a configuration of an image forming apparatus capable of implementing a packaging device according to the present invention.

An image forming apparatus 1 includes a printing device 11 and an image processing device 12.

The image processing device 12 is provided with a CPU 121 as a control unit and an arithmetic unit, a direct storage unit 122 as a main storage (e.g., RAM), and an indirect storage unit 123 as a secondary storage (e.g., ROM or HDD). Further, the image processing device 12 is provided with a user interface 124 as an input unit and an external interface 125 as an input-output unit.

The direct storage unit 122 is a storage unit directly exchanging data with the CPU 121, and the indirect storage unit 123 is a storage unit exchanging data with the CPU 121 via the direct storage unit 122. The direct storage unit 122 stores various application programs and a platform program.

The user interface 124 includes a keyboard, a mouse, a display, etc, and can receive an instruction from a user and can display data (screen data).

The external interface 125 can receive data from an external device and transmit data to the external device. The external device includes an external storage device such as an external HDD and a USB memory, and a separated host computer and apparatus such as an image forming apparatus connected via a network.

*Platform 13

The CPU 121 can transfer (store) the platform program stored in the indirect storage unit 123 to the direct storage unit 122. After the transfer, the CPU 121 comes to be able to execute the platform program.

A combination of the CPU 121, a region storing the platform program within the direct storage unit 122, and a region storing information obtained by the CPU 121 processing the platform program (calculation result and the like) is called a platform 13. The latter region is included in the direct storage unit 122 and the indirect storage unit 123. The present embodiment refers to above "the CPU 121 comes to be able to execute the platform program" as "the platform 13 becomes active".

*Application Program

The platform 13 can transfer (store) a first application program stored in the indirect storage unit 123 to the direct storage unit 122. After the transfer, the platform 13 comes to be able to execute the first application program. The present embodiment refers to this state as "the platform 13 activates the first application program".

Adversely, the platform 13 can delete the first application program stored in the direct storage unit 122. The present embodiment refers to this operation as "the platform 13 deactivates the first application program".

The platform 13 can receive and store data of the first application program via the external interface 125. At this time, the platform 13 stores the existence of the first application program and puts the first application program under its own management. The present embodiment refers to this operation as "the platform 13 installs the first application program therein".

Adversely, the platform 13 can delete the first application program stored in the indirect storage unit 123 (within the platform 13). The present embodiment refers to this operation as "the platform 13 uninstalls the first application program therefrom". Note that, when uninstalling the first application program, the platform 13 carries out the uninstalling after terminating the program if the program has been activated.

Further, while the above description has been given to an example of the first application program, it would be obvious for those skilled in the art that the description is also the same for another application program (e.g., a second application program).

*Packaging Device (Application Packaging Device) 2

Figure 2:
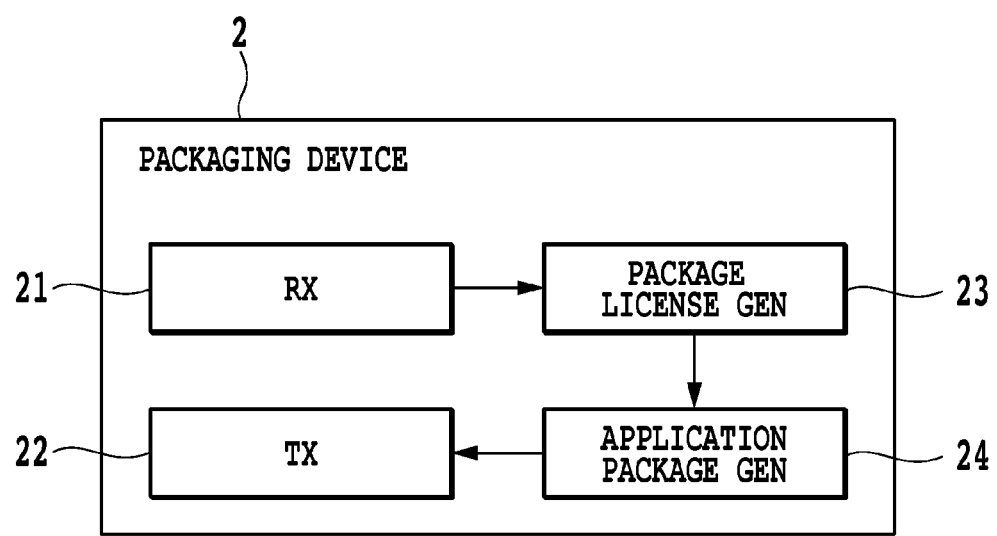
FIG. 2 is a block diagram showing a configuration of a packaging device according to the present invention.

FIG. 2 is a block diagram showing a configuration of a packaging device according to the first embodiment of the present invention.

The packaging device 2 is provided with a receiving unit 21, a transmission unit 22, a package license generation unit 23, and an application package generation unit 24. Details of the package license generation unit 23 and the application package generation unit 24 will be described hereinafter.

The packaging device 2 is realized by a device provided with a CPU, a main storage unit, a secondary storage unit, an input unit, and an output unit, and also realized by the image forming apparatus 1 including the image processing device 12 of FIG. 1 provided with the above units and additionally by a computer such as a PC and a workstation. The secondary storage unit stores an operation system (OS) and various programs. The OS and the various programs are loaded to the main storage unit from the secondary storage unit and executed by the CPU.

Note that, in the present specification, the above various programs include a packaging program. Further, this packaging program is loaded to the main storage, and the image forming apparatus 1 realizes the packaging device 2 provided with the above respective constituents according to the contents of the packaging program.

*Application 3

Figure 3:
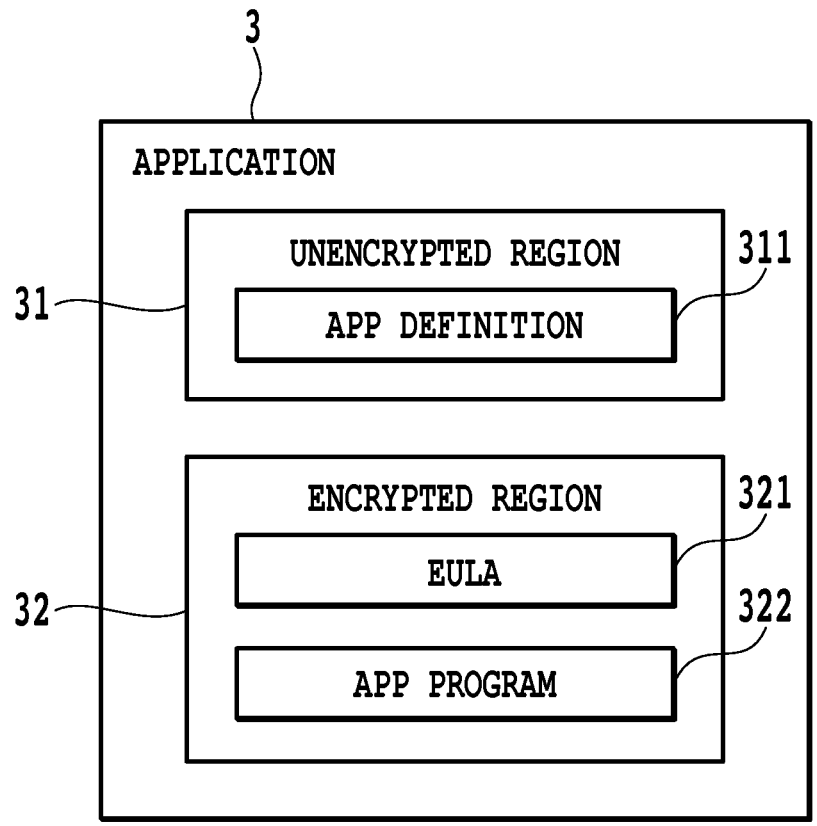
FIG. 3 is a configuration diagram of an application according to the present invention.

FIG. 3 is a configuration diagram showing a configuration of an application according to the first embodiment of the present invention.

An application 3 is configured with an unencrypted region 31 and an encrypted region 32. Further, a specific directory (directory called MANIFEST) within the unencrypted region 31 stores an application definition 311, to be described below, which is a file setting application information. In addition, a specific directory (directory called EULA) within the encrypted region 32 stores an end user license agreement 321 to be described below and the above application program 322.

The encrypted region 32 may be configured so as to be decryptable only if a license to be described below is valid and any encryption method may be used. This means that the valid license stores information (e.g., key) for decrypting the encrypted region 32.

*Application Definition 311

Figure 4:
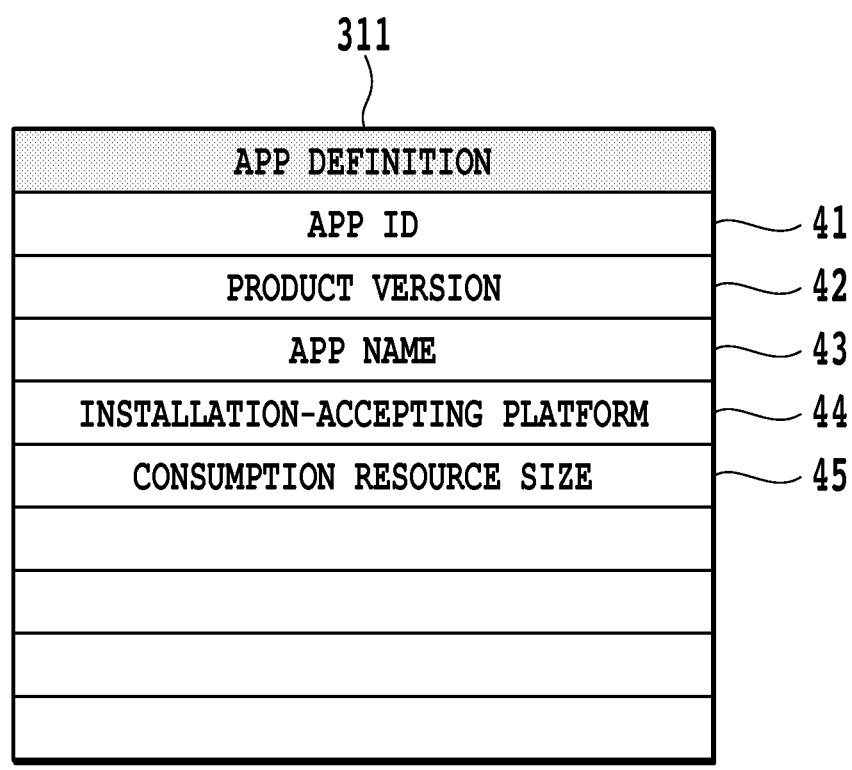
FIG. 4 is a diagram showing a configuration of an application definition according to the present invention.

FIG. 4 shows the configuration of the application definition according to the first embodiment of the present invention.

The application definition 311 is configured with an application ID 41, a product version 42, an application name 43, an installation-accepting platform 44, and a consumption resource size 45. The application ID 41 is an identifier uniquely identifying which is the application 3 among a plurality of applications. Further, a combination with the product version 42 can specify which application version of the application 3. Further, the application name 43 is a character string representing the designation of the application.

The installation-accepting platform 44 is a platform program which can install the application 3. The installation-accepting platform 44 indicates, for example, a kind or version of the platform program, a device unique ID, an ID indicating a function to be included in the platform program, etc.

The consumption resource size 45 defines a resource size necessary when the application 3 is installed or when the application 3 is executed after the installation. For example, the resource size may include a consumption size in the indirect storage unit 123 and a consumption size in the direct storage unit 122.

*License 5

Figure 5:
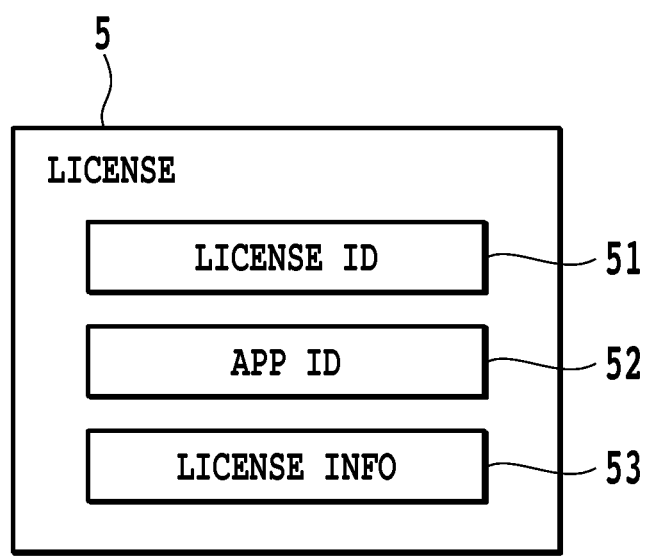
FIG. 5 is a configuration diagram of a license according to the present invention.

FIG. 5 is a configuration diagram showing a configuration of the license according to the first embodiment of the present invention.

The license 5 is configured with a license ID 51, an application ID 52, and license information 53. The license ID 51 is a unique ID for identifying the license 5. The application ID 52 stores information of the application ID 41 in the application 3 for which the license is set. The license information 53 stores a license definition of the license 5 (e.g., license valid term and the number of available times of licensing), information for decrypting the encrypted region 32 of the application 3, etc.

*Application Package 6

Figure 6:
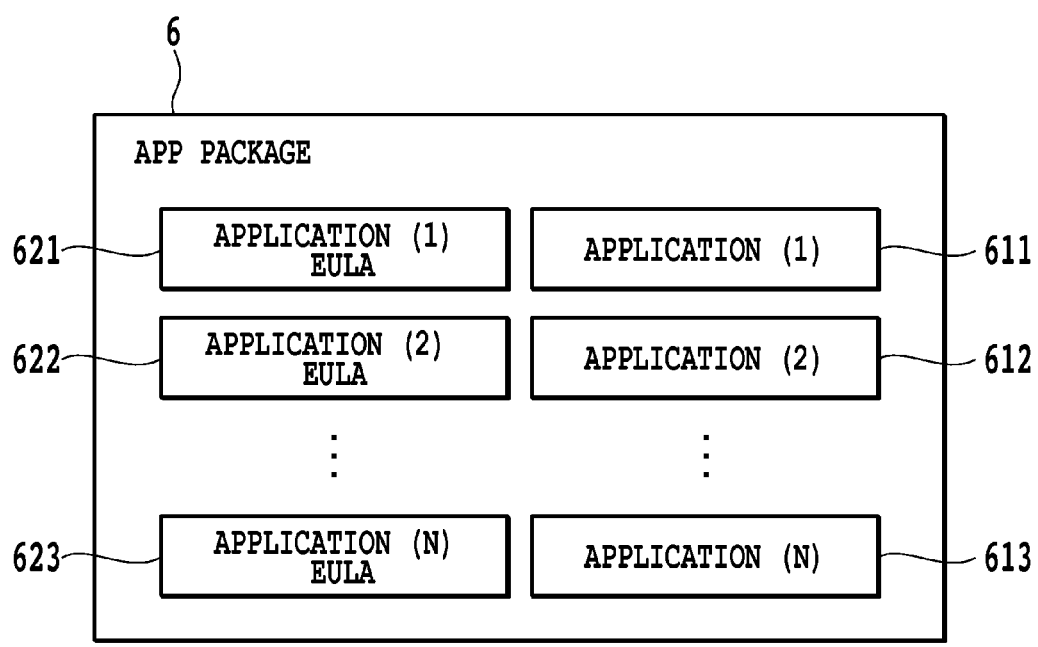
FIG. 6 is a configuration diagram of an application package according to the present invention.

FIG. 6 is a configuration diagram showing a configuration of an application package according to the present embodiment.

The application package 6 is an application package generated by the application package generation unit 24. The application package 6 is configured with a plurality of applications 611 to 613 and end user license agreements 621 to 623 corresponding to the plurality of applications. The generation processing of the application package 6 by the application package generation unit 24 will be described hereinafter.

*Package License 7

Figure 7:
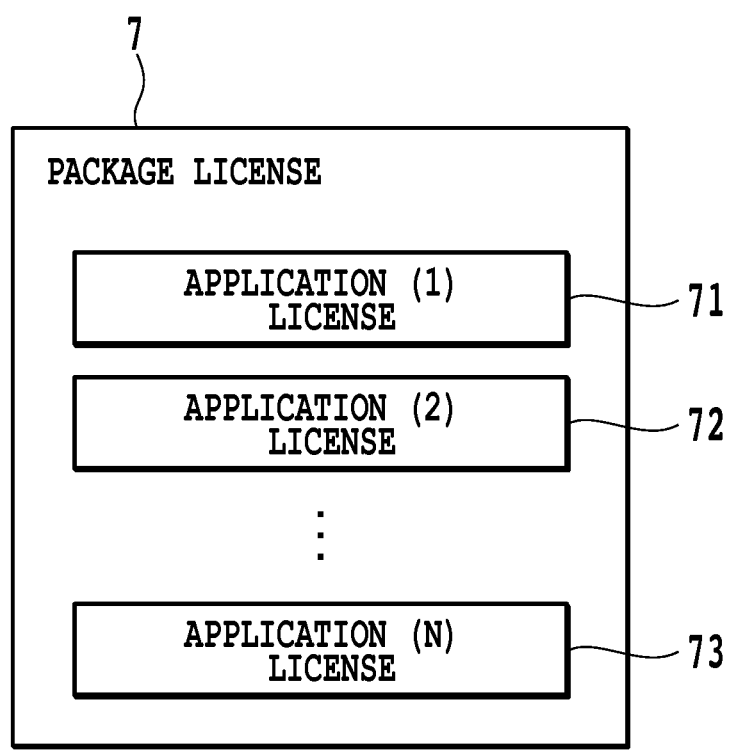
FIG. 7 is a configuration diagram of a package license according to the present invention.

FIG. 7 is a configuration diagram showing a configuration of a package license according to the present embodiment.

The application package 7 is a package license obtained by packaging a plurality of application licenses (71, 72, 73, etc.) generated by the package license generation unit 23. The package license 7 is configured with the plurality of licenses 71 to 73.

*Generation Processing of the Application Package 6

Figure 8:
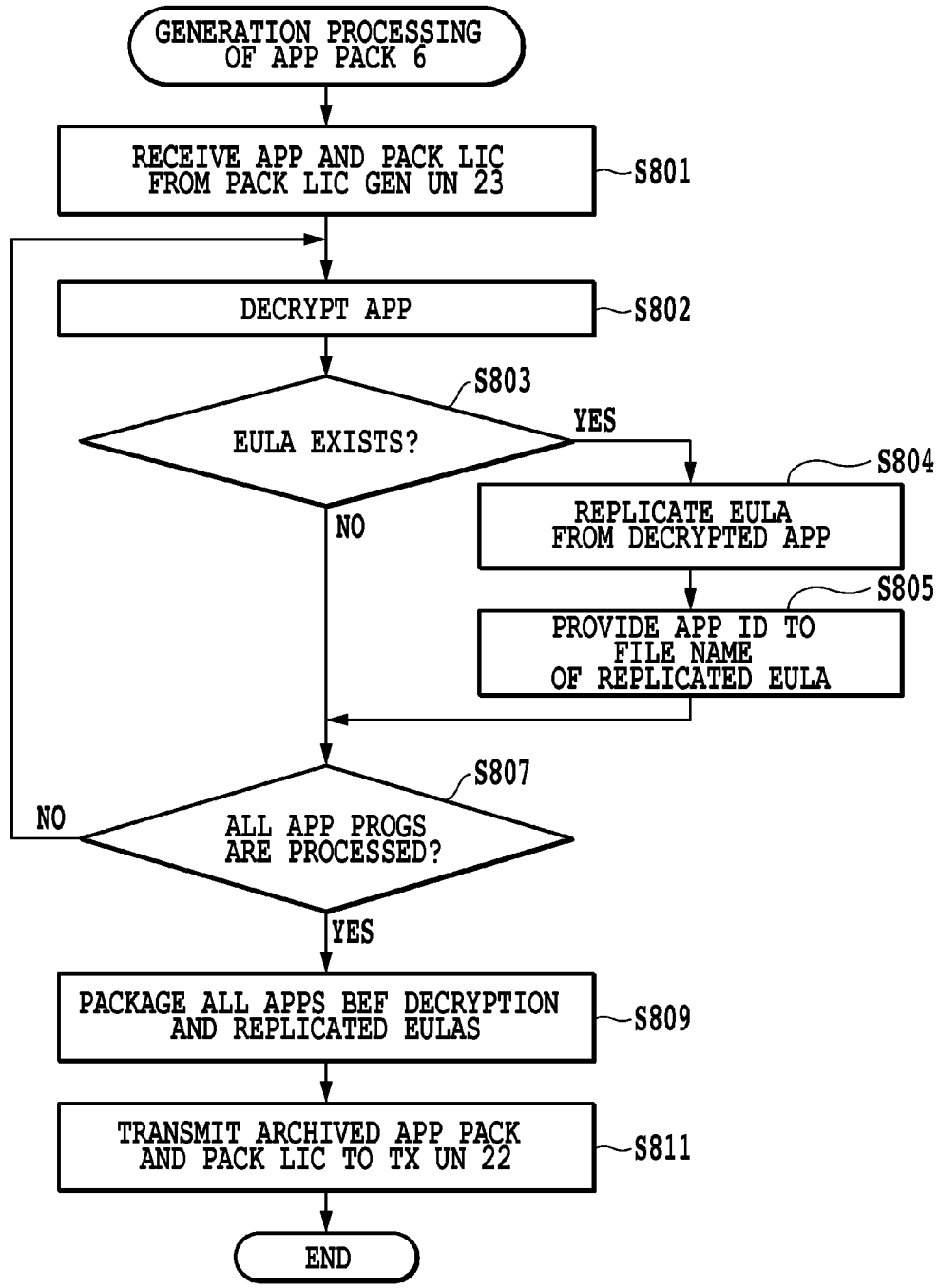
FIG. 8 is a flowchart of application package generation processing according to the present invention.

Generation processing of the application package 6 (S802 to S809) and Steps S801 and S811 in the application package generation unit 24 will be described by use of a flowchart of FIG. 8.

Figure 14:
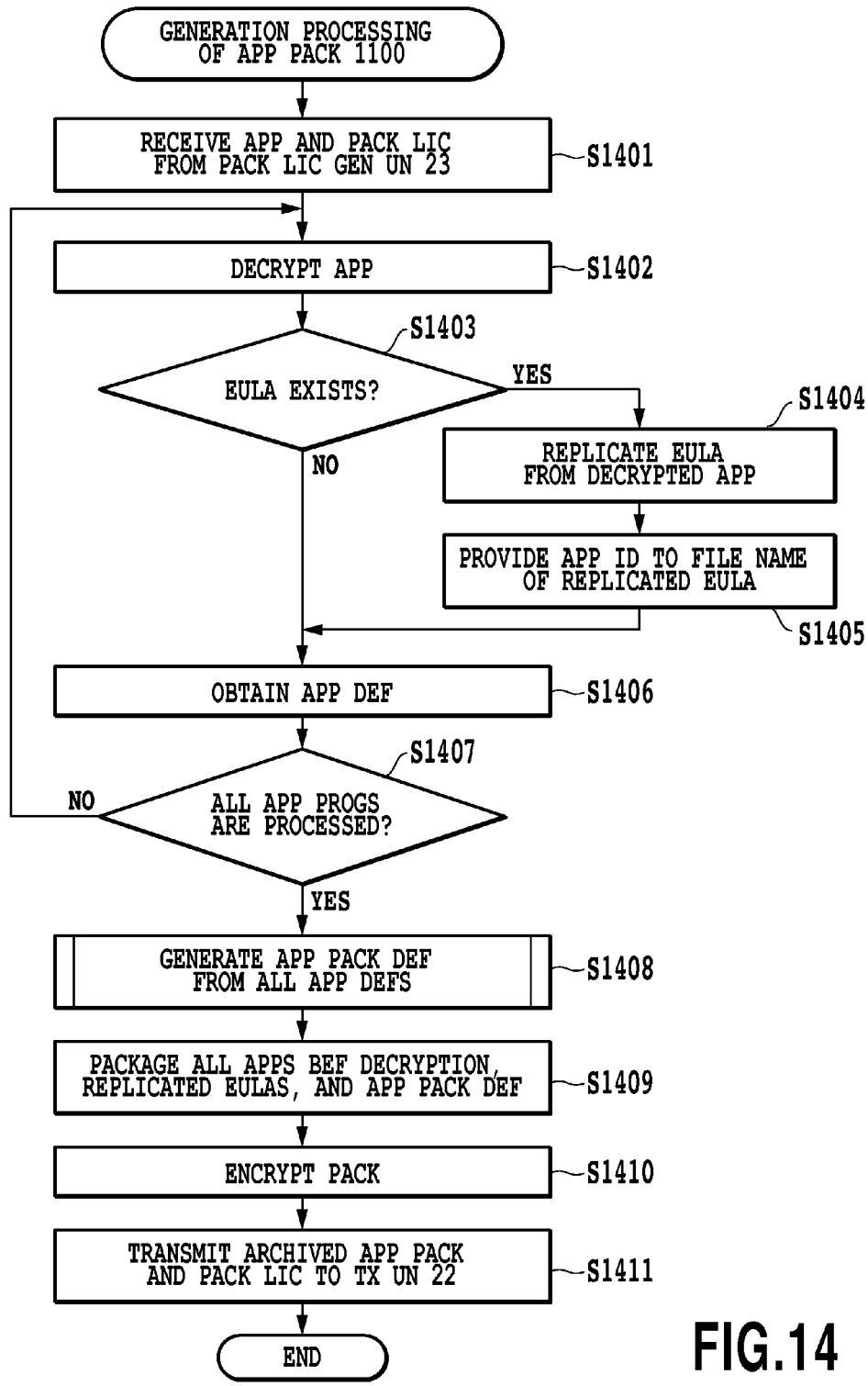
FIG. 14 is a flowchart of different application package generation processing according to the present invention.

Note that, in the present embodiment, the processing of Steps S802 to S809 is carried out automatically and does not depend on an instruction from a user. That is, an instruction from the user is not accepted during the processing from decryption processing of Step S802 to processing of packaging to obtain an application package in Step S809. The same is also applied to another embodiment (whole processing in Steps S1402 to S1410 of FIG. 14 is carried out automatically).

The application package generation unit 24 receives a plurality of applications 3 to be packaged from the package license generation unit 23. Together with the applications 3, the application package generation unit 24 receives the package license 7 of the licenses 5 corresponding to the respective applications 3 (S801).

Next, the application package generation unit 24 decrypts each of the received plurality of applications 3 (S802).

Next, the application package generation unit 24 selects one of the plurality of decrypted applications 3. Then, the application package generation unit 24 confirms whether the selected one application 3 has the end user license agreement 321 (S803), and carries out processing of Step S804 if the selected application has it. Since the end user license agreement 321 is stored in the specific directory within the application (e.g., directory called EULA), the application package generation unit 24 confirms whether the selected application has it or not by searching the specific directory. Further, a format is preferably specified also for the file name of the end user license agreement 321.

In Step S804, the application package generation unit 24 replicates the end user license agreement 321 included in the decrypted application 3. Subsequently, the application package generation unit 24 assigns the application ID 41 as an identifier uniquely specifying the end user license agreement 321 to a file name of the replicated end user license agreement 321 (S805). This assigned application ID 41 is used for specifying the application 3 of a replication source. Further, there can be a configuration in which one application 3 has the plurality of end user license agreements 321 (e.g., case of accommodating many languages), and, in this case, the application package generation unit 24 executes the replication and the ID assignment (S804 and S805) for all the end user license agreements 321.

The application package generation unit 24 subsequently carries out the above processing for all the applications 3 received in Step S801 (S807). Then, in Step S809, the application package generation unit 24 packages all the applications 3 before the decryption in Step S802 and the plurality of end user license agreements 321 replicated and assigned with the IDs in Steps S804 and S805, respectively. Thereby, the application package 6 is obtained.

Lastly, in Step S811, the application package generation unit 24 transmits the generated application package 6 and the package license 7 to the transmission unit 22.

Note that, in Steps S802 and S809, the application package generation unit 24 takes out the end user license agreement included in each of the encrypted applications from the application and obtains the application package 6 including the taken out end user license agreement and each application.

In other words, the application package generation unit 24 generates an application package which includes the end user license agreement included in each of the encrypted applications in a region different from that for the plurality of applications before the decryption, in Steps S802 and S809.

*Installation Management Table 900

Figure 9:
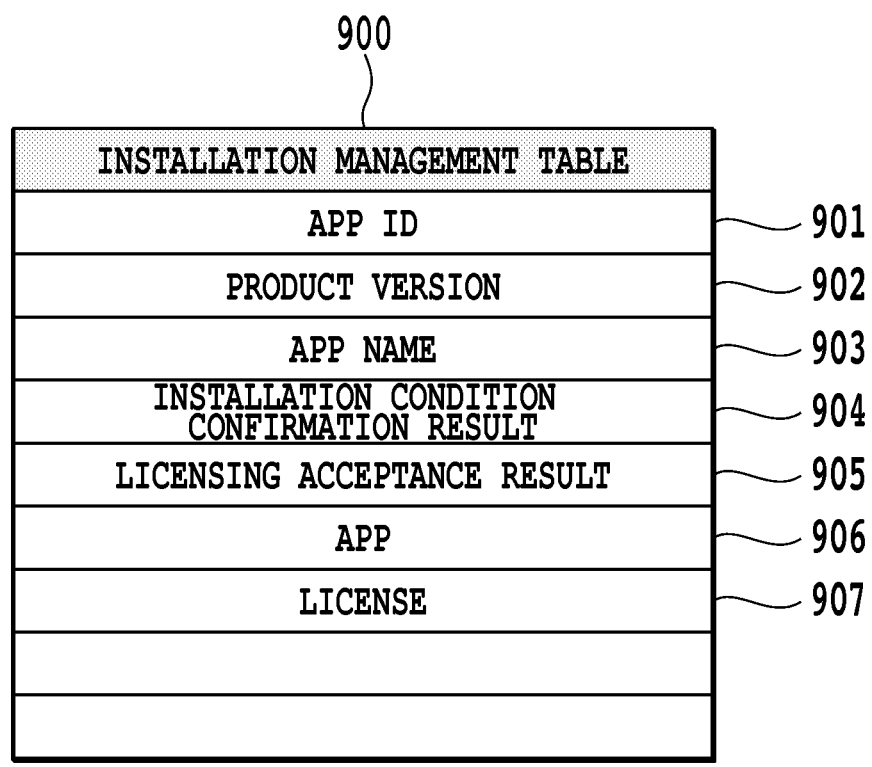
FIG. 9 is a diagram showing a configuration of an installation management table according to the present invention.

FIG. 9 shows a configuration of an installation management table 900.

The installation management table 900 is a table used for installation in the platform 13 to be described below and discarded after the installation has been completed. The installation management table 900 includes an application ID 901, a product version 902, and an application name 903 as constituents. These constituents are set by use of the application definition 311 in each of the applications 3. The installation management table 900 further includes an installation condition confirmation result 904 and a licensing acceptance result 905 as constituents. Details of these constituents will be described hereinafter. The installation management table 900 further includes an application 906 and a license 907 as constituents. These constituents are referred to each of the applications 3 and the corresponding license 5, respectively.

*Installation Processing of the Application Package 6

Installation processing of the application package 6 in the platform 13 will be described by use of flowchart of FIG. 10.

Note that, in the following description of the present specification, the installation processing means processing including the installation of the application program and processing accompanying the installation. In the present embodiment, the processing except Step S1031 is the installation processing of the application program and Step S1014 of the processing is a step of installing the application program. That is, during the installation processing of the application program, the installation of the application program is carried out.

The platform 13 obtains the application package 6 and the package license 7 from the external interface 125 (S1001). In other words, the platform 13 receives the application package 6 and the package license 7 via the external interface 125. At the same time, an instruction requesting the installation processing of the application package 6 is transmitted from a user who uses a device connected via the external interface 125.

Next, the platform 13 carries out the following processing in Step S1002. The platform 13 obtains the respective application definitions 311 of all the applications 3 included in the obtained application package 6, and obtains the license 5 corresponding to each of the applications from the obtained package license 7. Then, the platform 13 generates the installation management table 900 using the obtained respective applications 3, application definitions 311, and information of the license 5. Specifically, the platform 13 generates the installation management table 900 storing the information except the installation condition confirmation result 904 and the licensing acceptance result 905 (application definition 311 and information of the license 5).

Next, the platform 13 carries out the following processing in the registration order of the generated installation management table 900.

First, the platform 13 obtains the application definition 311 from the unencrypted region 31 of the application to be installed and obtains the license information 53 from the obtained license 5 (S1003). Next, the platform 13 carries out license confirmation and installation condition confirmation processing to be described below by using the obtained application definition 311 and the license information 53 (S1004 and S1017). If installation is possible in the result, the platform 13 updates the installation condition confirmation result 904 in the installation management table 900 with the information indicating that the installation is possible (S1005). On the other hand, if the installation is not possible, the platform 13 informs the external interface 125 of that the installation is not possible and requests an instruction from the user via the external I/F 125 (S1018).

After that, the platform 13 confirms the instruction from the user via the external interface 125 (confirms whether the installation processing is to be continued or not) (S1019). Then, If the installation is to be continued (the installation is confirmed to be continued in the instruction), the platform 13 updates the installation condition confirmation result 904 of the installation management table 900 with information indicating the installation is not possible (S1005). Further, if the installation is not to be continued (the installation is confirmed not to be continued in the instruction), the platform 13 discontinues the installation processing (S1031).

Then, the platform 13 repeats the above processing (S1003 to S1005, and S1017 to S1019) in the number of applications 3 registered in the installation management table 900 (S1006).

Next, the platform 13 carries out the following processing only for the application which has the information indicating that the installation is possible in the installation condition confirmation result 904, among the applications registered in the generated installation management table 900.

The platform 13 confirms whether the application package 6 has the replica of the end user license agreement 321 for the application 3 to be installed outside the application 3 to be installed, and obtains the replica if the application package 6 has it (S1007 and S1008). If the application package 6 does not have it, the platform 13 updates the licensing acceptance result 905 of the installation management table 900 with information indicating that the end user license agreement 321 is not related (S1010). If the application package 6 has it, the platform 13 notifies the obtained end user license agreement 321 to the external interface 125 (S1026).

Then, the platform 13 receives information whether the user accepts or not the notified end user license agreement 321, from the user via the external interface 125 (S1018). If the user accepts in the result, the platform 13 updates the licensing acceptance result 905 of the installation management table 900 with information indicating the acceptance (S1010). That is, the platform 13 updates the licensing acceptance result 905 with the information indicating the acceptance, when the platform 13 acquires the acceptance of the obtained end user license agreement from the user via the external interface 125. By this update, the object application is installed through Steps S1012 and S1013.

On the other hand, if the user does not accept the end user license agreement 321 in Step S1027, the platform 13 confirms with the user whether the installation processing is to be continued or not without change, via the external interface 125 (S1028 and S1029). Then, if the installation processing is to be continued, the platform 13 updates the licensing acceptance result 905 of the installation management table 900 with information indicating the agreement 321 is not accepted (S1010). On the other hand, if the installation processing is not to be continued, the platform 13 discontinues the installation processing (S1031).

Then, the platform 13 repeats the above processing (S1007 to S1008, S1026 to S1029, and S1010) only for "the application having the information indicating that the installation is possible in the installation condition confirmation result 904" in the number thereof among the applications registered in the installation management table 900 (S1011). Lastly, the platform 13 obtains the application indicating "the installation is possible in the installation condition confirmation result 904" and also indicating "not related or accepted in the condition confirmation result 904", among the applications registered in the installation management table 900 (S1012), and carries out the following processing for the obtained application.

First, the platform 13 decrypts the encrypted application (S1013). Next, the platform 13 installs an application program 322 included in the application 3 (S1014). The platform 13 repeats the processing until when the respective application programs 322 of all the applications 3 to be installed (S1015) are installed and terminates the installation processing.

In the following, the processing in Step S1014 (installation of the application program) will be described in detail.

First, the platform 13 installs the application program included in "the application for which the licensing acceptance result has been updated with the information indicating the acceptance in Step S1010". Further, the platform 13 does not install the application program included in "the application for which the licensing acceptance result has not been updated with the information indicating the acceptance in Step S1010".

In Step 1014, in addition, the platform 13 neglects the end user license agreements obtained in the decryption of the respective plurality of applications in Step S1013. This is because the licensing acceptance has been confirmed by the use of the replica of the end user license agreement in Steps S1010 and S1011.

*Installation Condition Confirmation Method

An installation condition confirmation method in the installation processing of the platform 13 will be described.

The platform 13 confirms the installation condition by directly comparing the information defined in the application definition 311 with device information (information of the platform 13 and the image processing device 12). The platform 13 particularly uses the installation-accepting platform 44 and the consumption resource size 45 among the information defined in the application definition 311.

For example, the following determination is made for the case that the version of the platform program is Version 2 and the remaining size of the indirect storage unit 123 is 100 MB in the image processing device 12.

When the platform program version is Version 1 in the installation-accepting platform 44 of the application 3 to be installed, the platform 13 determines that the application cannot be installed. That is, the platform 13 determines whether the application can be installed or not by judging whether the platform program is provided with a platform version which can install the application.

Further, the platform 13 determines that the application cannot be installed, when the consumption size for the indirect storage unit 123 is 120 MB in the consumption resource size 45 of the application 3 to be installed. That is, the platform 13 determines whether the application can be installed or not by judging whether the device is provided with a resource to be consumed by the application as a remaining resource.

Meanwhile, the following determination is made for the case that the device unique ID is "#####0000000000", and the provided function unique ID indicates "Print function version 1 and also SVGA for the display size of the user interface 124".

The platform 13 determines that the application cannot be installed when the device unique ID in the installation-accepting platform 44 of the application 3 to be installed is "#####0000000001". That is, the platform 13 determines whether the application can be installed or not by judging whether the device has an ID specific to a device which can install the application.

Further, the platform 13 determines that the installation is not possible when the function unique ID in the installation-accepting platform 44 of the application 3 to be installed indicates "Print function version 2". That is, the platform 13 determines whether the installation is possible or not by judging whether the device is provided with a function of a device which can install the application.

The application package 6 is described not to be encrypted in the present embodiment. However, the application package may include an encrypted region as the application 3 and may store the plurality of end user license agreements (621 to 623) obtained by the replication and the plurality of already encrypted applications (611 to 613). In this case, the application package generation unit carries out processing of encrypting the replicated end user license agreements between Steps S809 and S811. Similarly, the application package generation unit encrypts the plurality of already encrypted applications between Steps S809 and S811. That is, the applications are encrypted doubly. By storing the doubly encrypted applications and the encrypted replicas of the end user license agreements in the encrypted region in this manner, it is possible to prevent the end user license agreement from being falsified.

Note that, when encrypted between Steps S809 and 811, the package license obtained in Step S801 comes to store information for decryption (e.g., key).

According to the present embodiment, it is possible in installation processing of an application package to carry out jobs such as installation condition confirmation, license confirmation, and acceptance of a license agreement for all applications at a time at a start of the installation processing.

Accordingly, it is possible to prevent that input jobs such as the acceptance of an end user license agreement and an instruction to continue the installation processing are required during the installation processing and the installation processing becomes complicated.

(Second Embodiment)

The present embodiment will use the same symbol for the same configuration and constituent as those of the first embodiment, and description thereof will be omitted appropriately and a different point will be described in detail.

Figure 11:
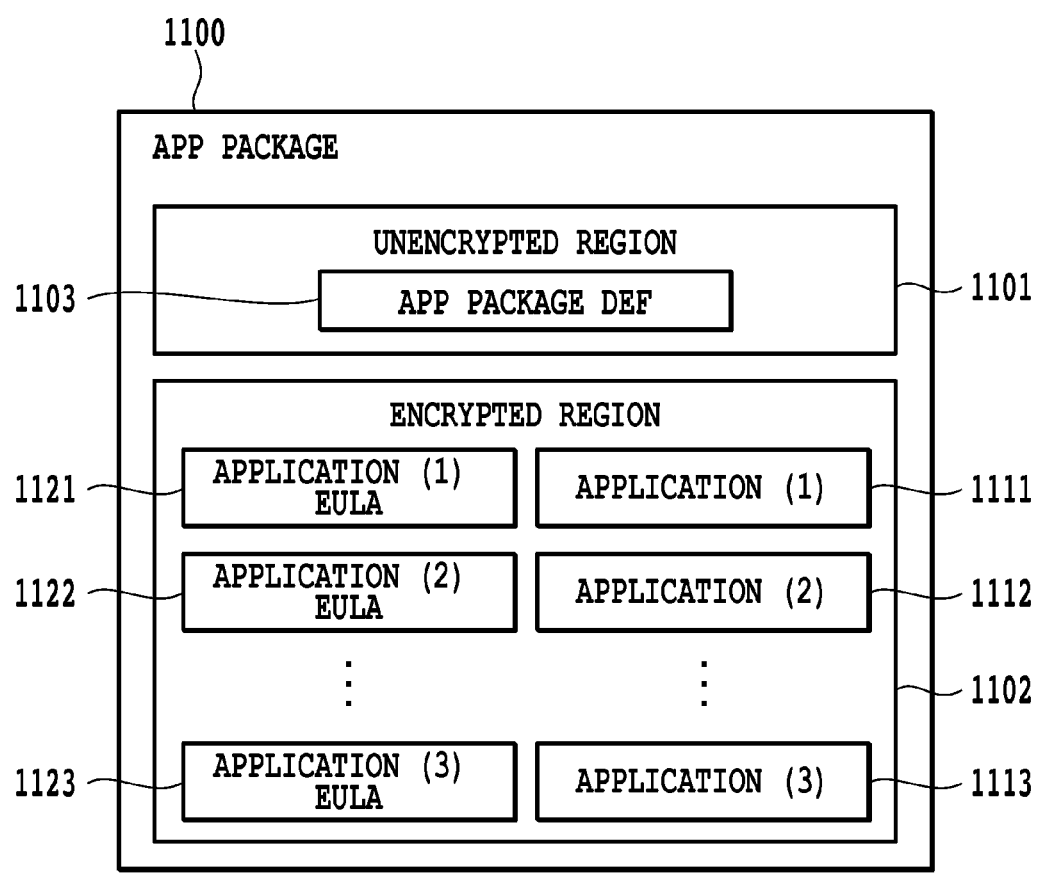
FIG. 11 is a configuration diagram of an application package according to the present invention.

First, while the application package in the first embodiment does not include an application package definition (FIG. 6), an application package of the present embodiment includes the application package definition (FIG. 11). Thereby, in the present embodiment, the plurality of application definitions need not to be confirmed individually (determination processing in S1017), but only the application package definition may be confirmed (determination processing in S1517).

Further, the present embodiment carries out various operations according to the kind of information in the application definition for generating the application package which includes the application package definition. Such an operation is not carried out in the first embodiment which does not generate the application package definition.

*Application Package 1100

FIG. 11 is a configuration diagram showing a configuration of the application package according to the present embodiment.

An application package 1100 is the application package generated by an application package generation unit 24 to be described hereinafter. The application package 1100 is configured with an unencrypted region 1101 and an encrypted region 1102. Further, a specific directory (directory called MANIFEST) within the unencrypted region 1101 stores the application package definition 1103 to be described below. In addition, the encrypted region 1102 stores a plurality of applications 1111 to 1113 and a plurality of corresponding end user license agreements 1121 to 1123.

The encrypted region 1102 should be configured to be decryptable only when a package license to be described below is valid, and any encryption method can be used. This means that the valid package license stores information (e.g., key) for decrypting the encrypted region.

*Application Package Definition 1103

Figure 12:
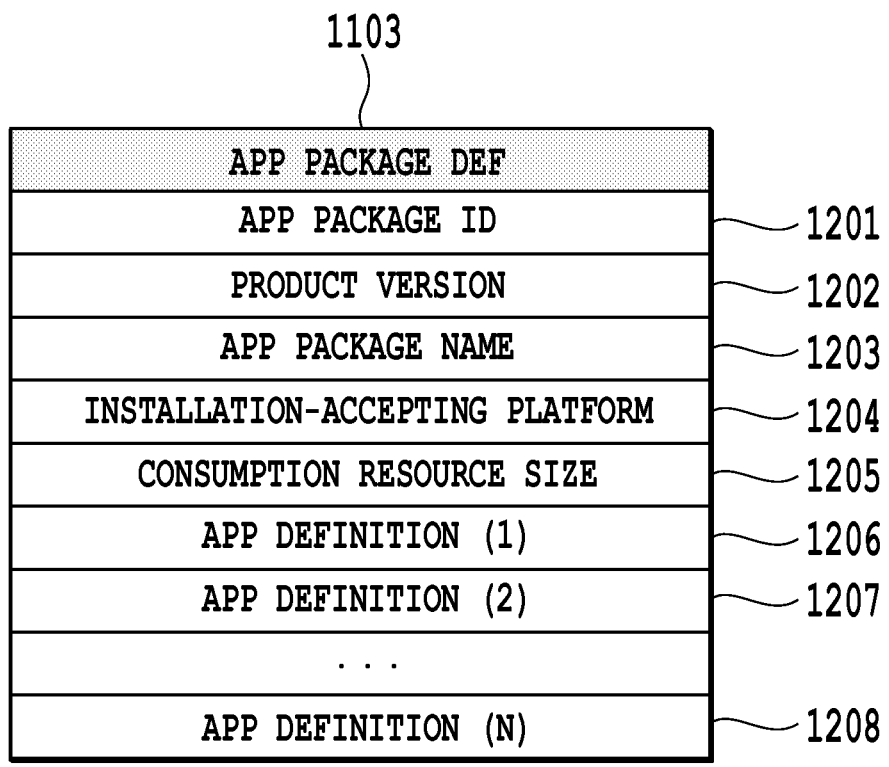
FIG. 12 is a diagram showing a configuration of an application package definition according to the present invention.

FIG. 12 shows a configuration of the application package definition according to the present embodiment.

An application package definition 1103 is configured with an application package ID 1201, a product version 1202, an application package name 1203, an installation-accepting platform 1204, and a consumption resource size 1205, and includes the respective application definitions 311 of all the applications included in the application package 1100, as application definitions 1206 to 1208.

The application package ID 1201 is an identifier for uniquely identifying which is the application package 1100 among a plurality of application packages. Further, the combination with the product version 1202 can specify which application package version of the application package 1100. In addition, the application package name 1203 is a character string representing the designation of the application package.

The installation-accepting platform 1204 indicates a platform program which can install all the applications 3 included in the application package 1100. The installation-accepting platform 1204 indicates, for example, a kind or version of the platform program, a device unique ID, an ID specific to a function to be included in the platform program, etc. The consumption resource size 1205 defines a resource size necessary when all the applications included in the application package 1100 are installed, or when the applications are executed after the installation. For example, the resource size may include a consumption size in the indirect storage unit 123 and a consumption size in the direct storage unit 122.

*Package License 1300

Figure 13:
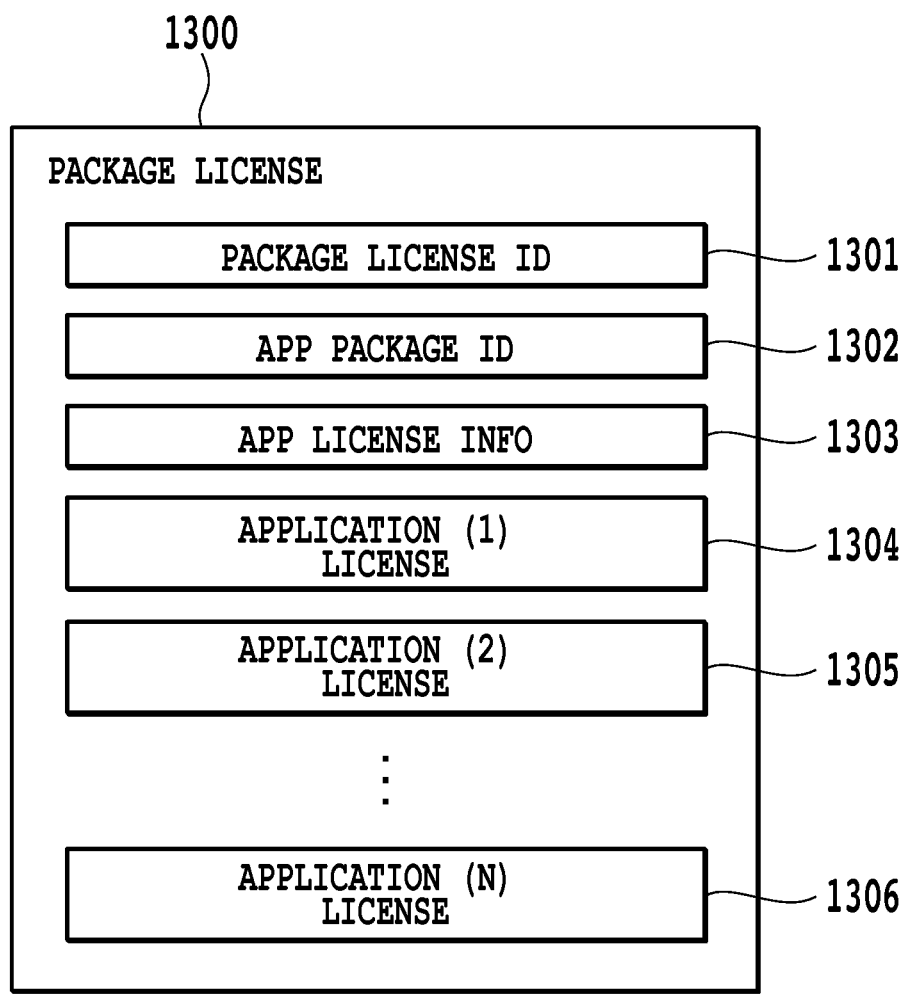
FIG. 13 is a configuration diagram of a package license according to the present invention.

FIG. 13 is a configuration diagram showing a configuration of a package license according to the present embodiment.

The package license 1300 is a package license obtained by packaging the plurality of licenses 5 (1304, 1305, 1306, etc.) generated by the package license generation unit 23. The package license 1300 is configured with a package license ID 1301, an application package ID 1302, package license information 1303, and a plurality of licenses 1304 to 1306.

The package license ID 1301 is a unique ID for identifying the package license 1300. The application package ID 1302 stores information of the application package ID 1201 of the application package 1100 for which the license is set. The package license information 1303 stores a package license definition of the package license 1300 and information for decrypting the encrypted region 1102 of the application package 1100. This package license definition includes, for example, a valid term and the number of times of available licensing.

*Generation Processing of the Application Package 1100

Generation processing of the application package 1100 (S1402 to S1410) and Steps S1401 and S1411 in the application package generation unit 24 will be described by use of a flowchart of FIG. 14.

The application package generation unit 24 receives the plurality of applications 3 to be packaged and the package license 1300 of licenses 5 corresponding to the respective applications 3 from the package license generation unit 23 (S1401). In subsequent Steps S1402 to S1405, the application package generation unit 24 carries out the same processing as that in Steps S802 to S805 shown in FIG. 8.

Subsequent to Step S1405, the application package generation unit 24 obtains the application definition 311 included in the application (S1406).

Then, the application package generation unit 24 carries out processing of Steps S1402 to S1406 for all the applications 3 received in Step S1401 (S1407). After that, the application package generation unit 24 generates the application package definition 1103 from all the obtained application definitions 311 to be described below (S1408).

Next, the application package generation unit 24 carries out processing of Step S1409. That is, the application package generation unit 24 packages all the applications 3 before the decryption in Step 1402, the end user license agreements 321 replicated and assigned with IDs in Steps S1404 and S1405, respectively, and the application package definition 1103 generated in Step S1408. Thereby, the application package 1100 can be obtained.

Next, the application package generation unit 24 encrypts the obtained application package 1100 (S1410).

Lastly, the application package generation unit 24 transmits the generated application package 1100 and the package license 1300 to the transmission unit 22 (S1411).

Note that the application package generation unit 24 takes out the end user license agreement included in each of the encrypted applications from the application in Steps S1402 and S1409.

Further, in Steps S1406, S1408 and S1409, the application package generation unit 24 logically or arithmetically combines the application definitions included in the respective applications and generates one application package definition.

Then, the application package 1100 is obtained which includes the taken out end user license agreements, the one generated application package definition, and each of the applications.

That is, the application package generation unit 24 generates the application package which includes the end user license agreement included in each of the encrypted application in a region different from that for the plurality of applications before the decryption, in Steps S1402 and S1409.

Further, in Steps S1406, S1408 and S1409, the application package generation unit 24 generates the application package which includes the application package definition in a region different from that for the plurality of applications. Note that, as described above, the application package definition is obtained by logically or arithmetically combining the application definitions defined for each of the applications.

The phrase "logically or arithmetically combine" in the present specification means to determine each of constituents of the application package definition necessary for installing all the applications within the package, by performing various logical/arithmetic operations depending on the kind of information within the application definition. The above phrase "logically or arithmetically combine" is used to have the same meaning in the claims applied at the same time.

The present embodiment explains the method to assign the application ID 41 of the application 3 to the file name of the end user license agreement 321 for specifying the application 3 which originally owns the replicated end user license agreement 321. However, any method may be used if the method can specify the application 3 from which the end user license agreement 321 is replicated. For example, it is possible to use a method of generating a table associating the application 3 with the replica of the end user license agreement 321 and storing the table in the application package definition 1103 within the application package 1100.

*Generation Method of the Application Package Definition 1103

The application package generation unit 24 generates the application package definition 1103 by logically or arithmetically combining the information sets defined in the respective application definitions 311. The application package generation unit 24 operationally combines particularly the information sets in the installation-accepting platform 44 and the consumption resource size 45, respectively, among the information sets defined in the application definitions 311.

For example, the application definition 311 is assumed as follows for one application. The installation-accepting platform program version is Version 2. The consumption size for the indirect storage unit 123 is 100 MB. The ID specific to the installation-accepting device is "#####0000000000, #####0000000001". The required function unique ID indicates "Print function version 2 and also SVGA or VGA" for the display size of the user interface 124". Note that the description "#####0000000000, #####0000000001" means "#####0000000000" or "#####0000000001".

Further, the application definition 311 is assumed as follows for another application. The installation-accepting platform program version is Version 1 or 2. The consumption size for the indirect storage unit 123 is 120 MB. The ID specific to the installation-accepting device is "####0000000000". The required function unique ID is "Print function version 1".

In the above case of the application definitions 311, the application package definition 1103 is generated by the use of the respective constituents determined as follows. That is, it is determined what operation is to be used depending on the kind of information within the application definition, and the determined operation is carried out.

Specifically, it is determined that AND is to be taken by the use of a logical product operation for the version. It is determined that a sum total is to be obtained by the use of arithmetic sum for the installation-accepting size of the indirect storage unit 123. It is determined that a logical product operation is to be used for the ID specific to the installation-accepting device. It is determined that a logical sum operation is to be used for the function unique ID required for the installation.

The logical product operation provides Version 2 for the version of the platform program which can install all the applications included in the application package.

The installation-accepting size of the indirect storage unit 123 is 220 MB or larger for installing all the applications included in the application package. This size is obtained by the arithmetic sum (summation) of the numerical values. That is, the size is obtained from 120 MB+100 MB=220 MB.

Then, the ID specific to the device which can install all the applications included in the application package is "#####0000000000". This ID is obtained also by the logical product. AND is taken by the logical product operation of "#####10000000000" and "#####0000000000 and #####0000000001", which gives "#####0000000000".

Then, the ID specific to the function necessary for installing all the applications included in the application package comes to indicate "Print function version 2 and also SVGA or VGA for the display size of the user interface 124". This is obtained by the logical sum operation (OR).

In this manner, the application package generation unit 24 generates the application package definition 1103 by logically or arithmetically combining information sets defined in the respective application definitions 311 using a different arithmetic operation or logical operation depending on the kind of the information set.

*Installation Processing of the Application Package 1100

Figure 15A:
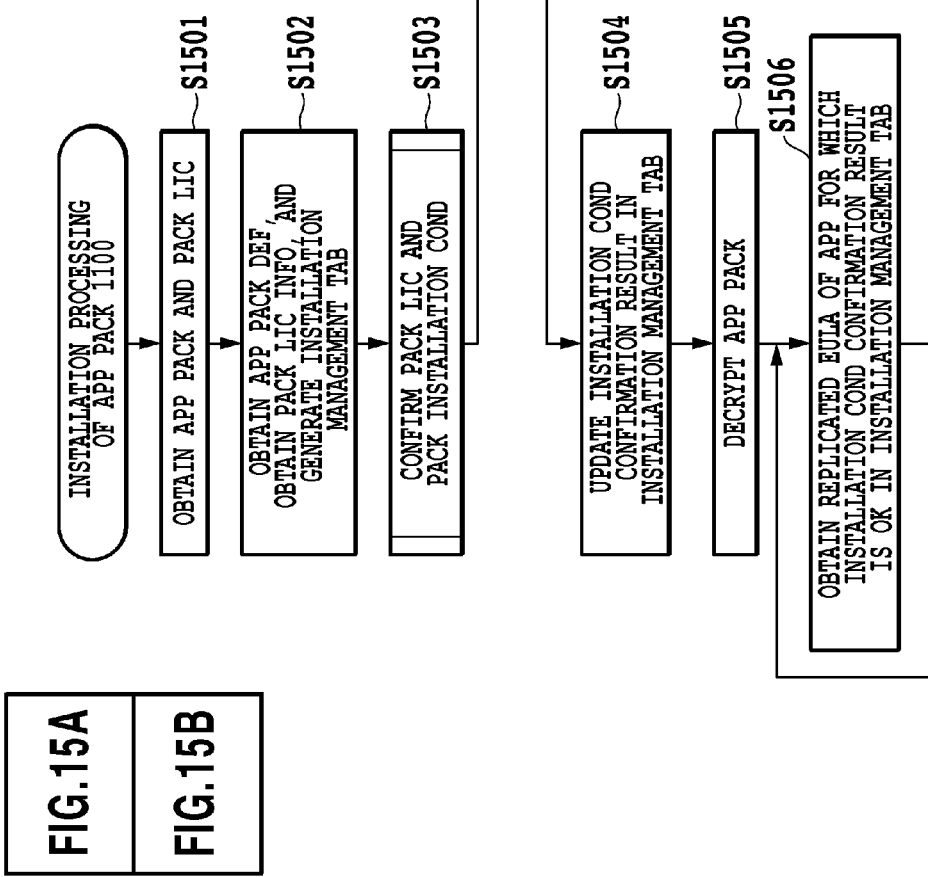
FIG. 15A shows a top view of a flowchart of different application package installation processing according to the present invention and FIG. 15B shows a bottom view of the flowchart.
Figure 15B:
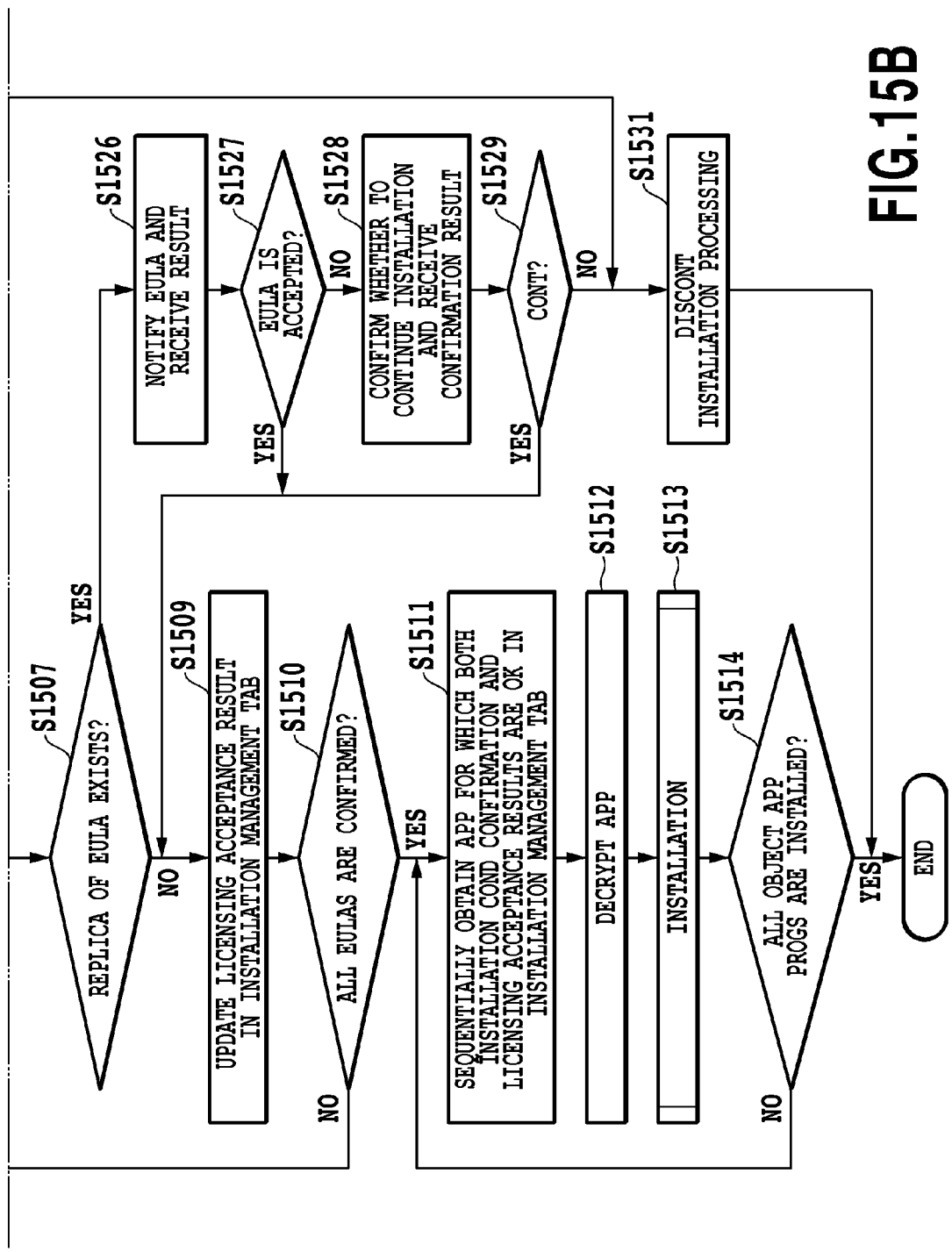

The installation processing of the application package 1100 in the platform 13 will be described by the use of a flowchart of FIG. 15.

In the present embodiment, the processing except Step S1531 is the installation processing of the application package, and Step S1513 of the processing is a step of installing the application program. That is, the application program is installed during the installation processing of the application package.

The platform 13 obtains the application package 1100 to be installed and the package license 1300 through the external interface 125 (S1501).

Next, the platform 13 carries out the following processing in Step S1502. The platform 13 obtains the application package definition 1103 included in the application package 1100 and the package license information 1303 included in the package license 1300. Then, the platform 13 generates the installation management table 900 using the obtained information of application package definition 1103 and package license information 1303. Specifically, the platform 13 generates the installation management table 900 storing the information (application definition 311 and information of the license 5) except the installation condition confirmation result 904 and licensing acceptance result 905 of the installation management table 900.

Next, the platform 13 carries out confirmation of the package license and the package installation condition to be described below using the information of the application package definition 1103 and the package license information 1303 (S1503 and S1517). Then, if all the applications are installable in the license and installation condition confirmation result, the platform 13 updates the installation condition confirmation results 904 for all the applications in the installation management table 900 with the information indicating that the installation is possible (S1504). Further, if even one application is not installable in the installation condition confirmation result, the platform 13 notifies the external interface 125 about that the installation is not possible and requests an instruction from a user via the external I/F 125 (S1518).

After that, the platform 13 confirms the instruction from the user via the external interface 125 (confirms whether the installation is to be continued or not without change) (S1519). If the installation is to be continued in the result, the platform 13 updates the installation condition confirmation result 904 for the application which is not installable in the installation management table 900 with the information indicating that the installation is not possible (S1504). Obviously, if there exists the application for which the installation is possible in the result of the installation condition confirmation, the installation condition confirmation result 904 for the application is updated with the information indicating that the installation is possible (S1504). Further, if the installation is not to be continued, the platform 13 discontinues the installation processing (S1531).

Subsequent to the update of the installation condition confirmation result 904, the platform 13 decrypts the application package (S1505).

Next, the platform 13 carries out the following processing only for the application for which the installation condition confirmation result 904 has been set to have the information indicating that the installation is possible, among the applications registered in the generated installation management table 900.

The platform 13 confirms whether or not the application package 1100 has the replica of the end user license agreement 321 of the application 3 to be installed outside the application 3 to be installed (S1506 and S1507).

Figure 10B:
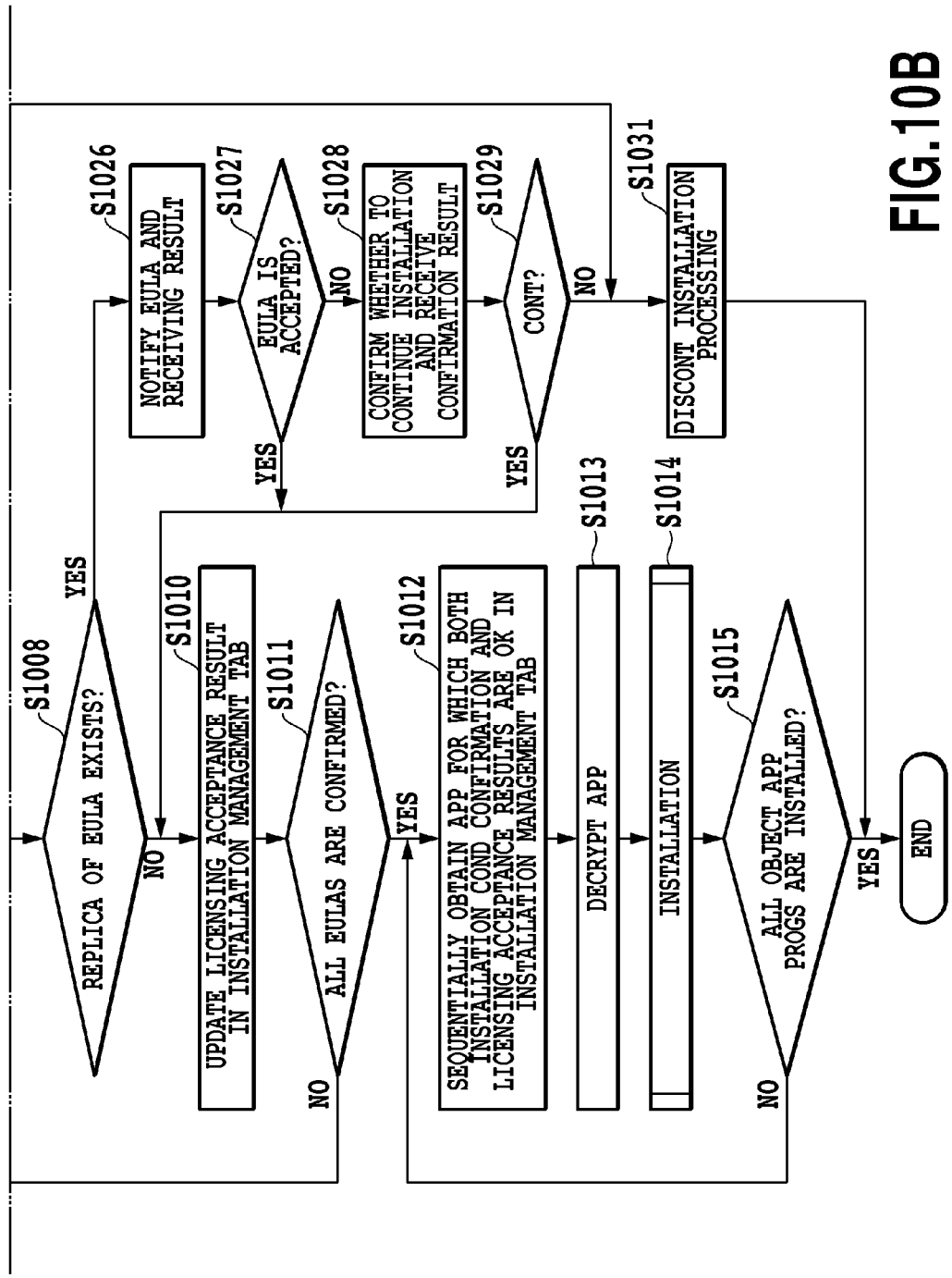

Depending on the above confirmation result, the platform 13 carries out the processing of Step S1526 and the succeeding steps which is the same as the processing of Step 1026 and the succeeding steps shown in FIG. 10 or the processing of Step S1509 and the succeeding steps which is the same as the processing of Step 1010 and the succeeding steps. The application program installation in Step S1513 included in the latter processing is carried out the same as the application program installation in Step S1014 shown in FIG. 10.

*Package Installation Condition Confirmation Method

A package installation condition confirmation method in the installation processing of the platform 13 will be described.

The platform 13 confirms the installation condition by comparing the information of the application package definition 1103 and the information of the platform 13 and the image processing device 12. The platform 13 uses particularly the installation-accepting platform 1204 and the consumption resource size 1205 among the information defined in the application package definition 1103.

For example, the platform 13 determines as follows for the case that the platform program version is Version 2 and the remaining size in the indirect storage unit 123 of the image processing device 12 is 100 MB. Further, the platform 13 also determines as follows for the case that the device unique ID is "#####0000000000" and the provided function unique ID indicates "Print function version 1 and Scan function version 1 or version 2".

The platform 13 determines that the installation is not possible for all the applications included in the application package 1100 when the installation-accepting platform program version is Version 1 in the application package 1100. That is, the platform 13 determines whether the installation is possible or not by judging whether the platform program is provided with a platform version which can install the application.

Further, the platform 13 determines that the installation is not possible for all the applications 3 included in the application package 1100 when the consumption size for the indirect storage unit 123 in the application package 1100 to be installed is 120 MB. That is, the platform 13 determines whether the installation is possible or not by judging whether the device is provided with a remaining resource which is to be consumed by the applications.

Further, the platform 13 determines that the installation is not possible for all the applications 3 included in the application package 1100 when the device unique TD is "#####0000000001" in the application package to be installed. That is, the platform 13 determines whether the installation is possible or not by judging whether the device has an ID specific to a device which can install the applications.

Further, the platform 13 determines that the installation is not possible for all the applications 3 included in the application package 1100 when the function unique ID indicates "Print function version 2" in the application package 1100 to be installed. That is, the platform 13 determines whether the installation is possible or not by judging whether the device is provided with a device function which can install the applications.

Further, the platform 13 subsequently determines whether the installation is possible or not individually for each of the applications included in the application package 1100 using the individual application definitions 311 included in the application package definition 1103 when the installation has been determined not to be possible for all the applications 3 included in the application package 1100.

In this manner, the platform 13 determines whether the installation is possible or not by comparing the information defined in the application package definition 1103 with the device information.

According to the present embodiment, it is possible in installation processing of an application package to carry out jobs such as installation condition confirmation, license confirmation, and acceptance of a licensing agreement for all applications at a time at a start of the installation processing. Further, generating of an application package definition and a package license information achieves an improvement in a performance of the installation condition confirmation processing and the license confirmation processing. Thereby, it is possible to prevent that input jobs such as the acceptance of an end user license agreement and an instruction to continue the installation processing are required during the installation processing and the installation processing becomes complicated.

Further, according to the above first and second embodiments, the end user license agreement existing in each of the plurality of encrypted applications is taken out of the application. Thereby, it is possible to acquire the acceptance of the end user license agreement from the user without waiting for the decryption of the plurality of encrypted applications. That is, it is possible to acquire the acceptance of the end user license agreement in the first half of the installation processing and to carry out the installation processing smoothly.

Thereby, it is possible to eliminate the complicated situation that the acceptance request of the end user license agreement occurs many times during the installation processing of the application package including the plurality of encrypted applications. Further, since the above request does not occur after the middle of the installation processing, the user needs not wait from the start to the end of the installation processing for carrying out the operation of the troublesome acceptance inputting and can perform the installation processing easily.

(Third Embodiment)

The following two embodiments are applied to the case that the installation in each of the above embodiments is a special installation (reinstallation). The present embodiment will use the same symbol for the same configuration and constituent as those of the first embodiment, and description thereof will be omitted appropriately and a different point will be described in detail. For easy understanding of the following description, the above described drawings including FIG. 1 are to be referred to in addition to FIG. 16 and the succeeding drawings to be referred to below.

*Application 1603

Figure 16:
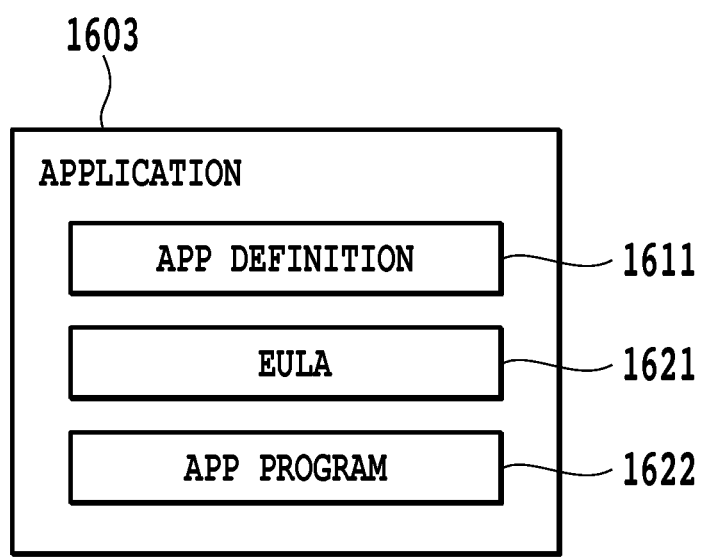
FIG. 16 is configuration diagram of another application according to the present invention.

FIG. 16 is a block diagram showing a configuration of an application according to a third embodiment of the present invention.

A specific directory (directory called MANIFEST) in the application 1603 stores an application definition 1611 to be described below. Further, another specific directory (directory called EULA) in the application 1603 stores an end user license agreement 1621 and the above application program 1622.

*Application Definition 1611

Figure 17:
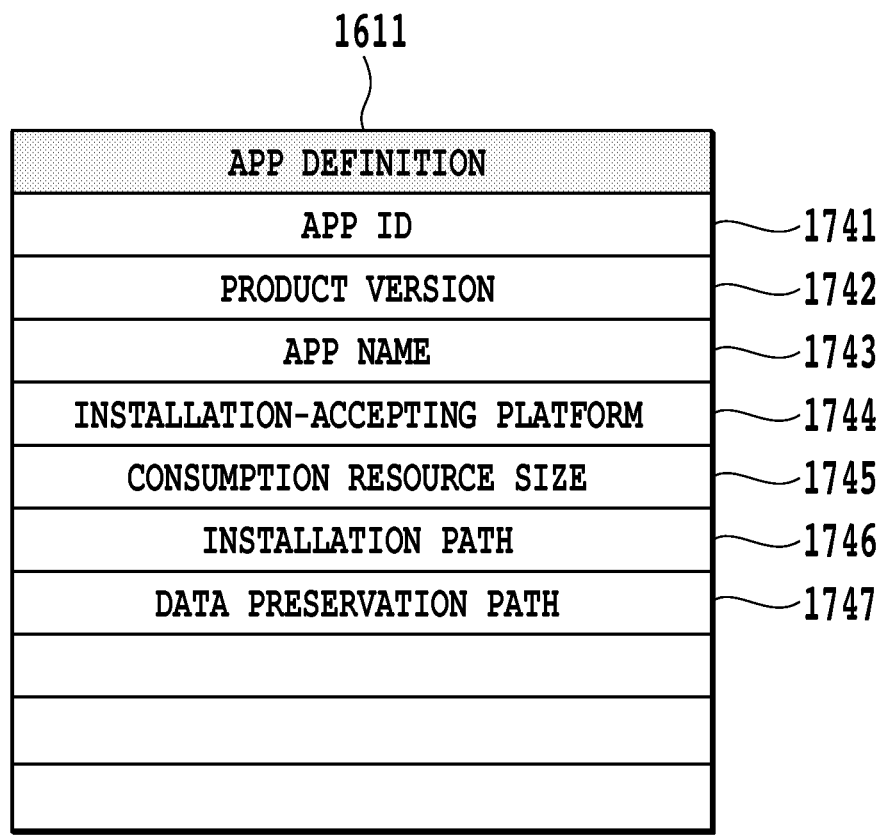
FIG. 17 is a diagram showing a configuration of another application definition according to the present invention.

FIG. 17 shows a configuration of the application definition according to the third embodiment of the present invention.

The application definition 1611 includes the same constituents 1741 to 1745 as the constituents 41 to 45 shown in FIG. 4, an installation path 1746, and a data preservation path 1747. The installation path 1746 defines installation path (location) information for the installation of the application 1603. The data preservation path 1747 defines preservation path (location) information of data which is used by the application 1603 after the installation.

*Application Package 1800

Figure 18:
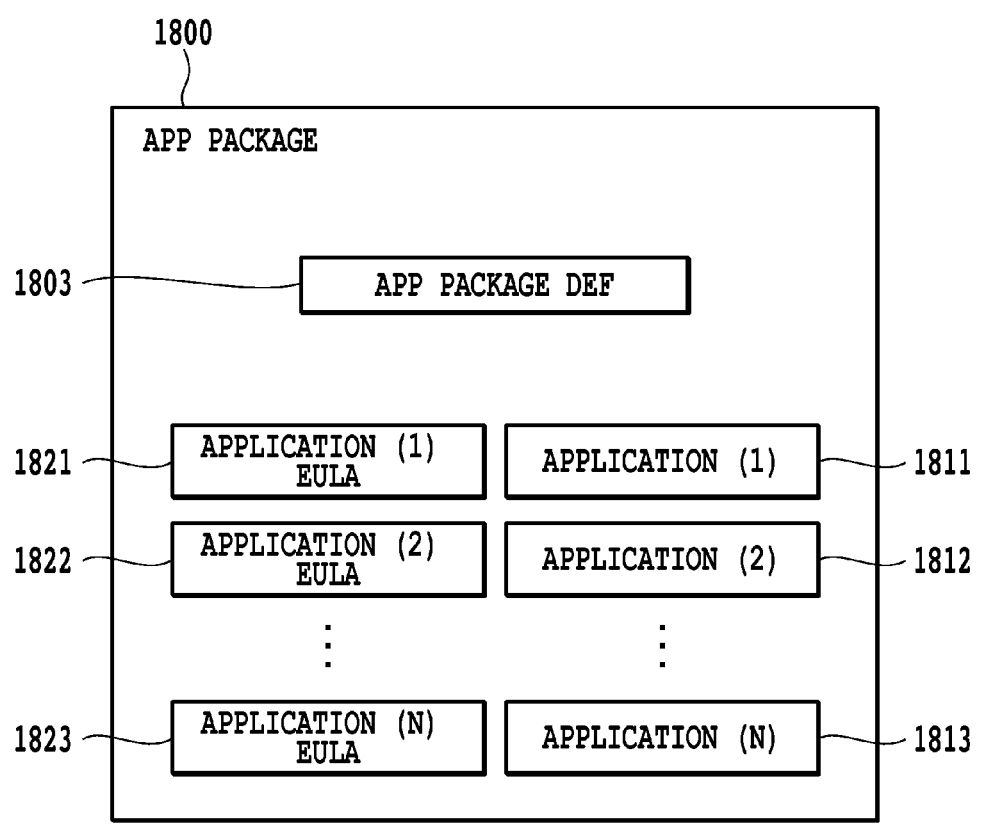
FIG. 18 is a configuration diagram of another application package according to the present invention.

FIG. 18 is a block diagram showing a configuration of an application package according to the present embodiment.

A specific directory (directory called MANIFEST) within the application package 1800 stores an application package definition 1803 to be described below. Further, the application package 1800 stores a plurality of applications 1811 to 1813 and corresponding end user license agreements 1821 to 1823 of the plurality of applications. The present embodiment assumes that the application installation in the platform 13 is carried out in the unit of the application package 1800. Together with the installation of the application package, an application package definition 1803 to be described below is also preserved in the platform 13 at the installation.

*Application Transfer Package 500

Figure 19:
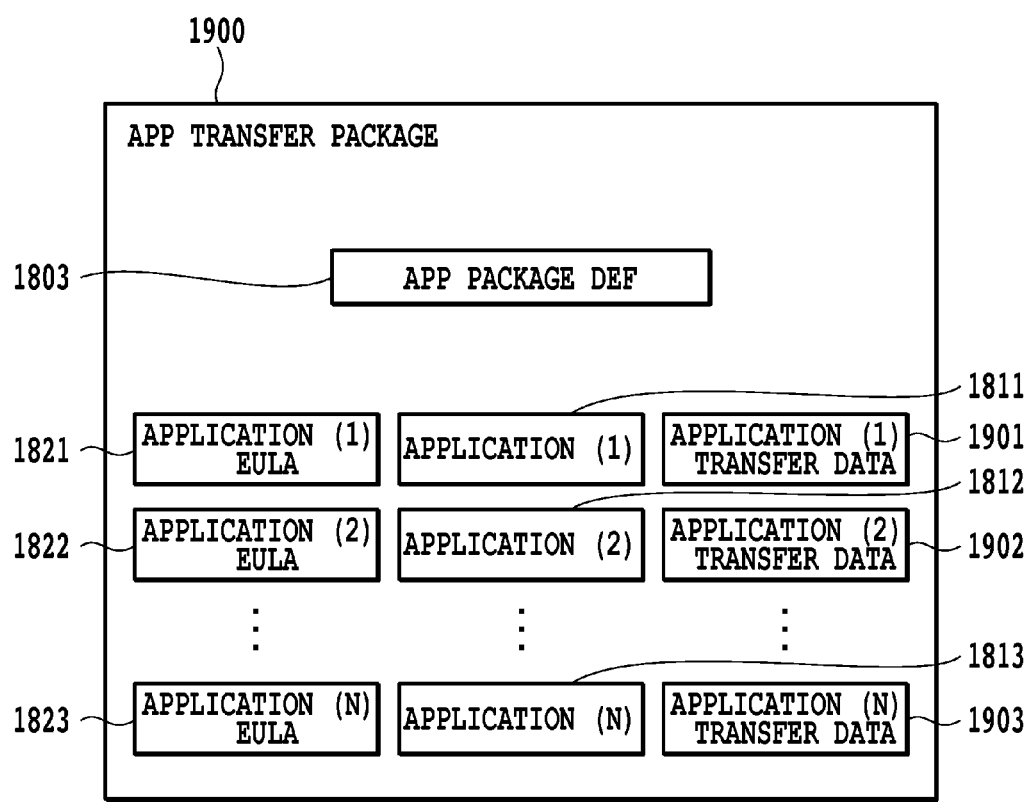
FIG. 19 is a configuration diagram of an application transfer package according to the present invention.

FIG. 19 is a block diagram showing a configuration of an application transfer package according to the third embodiment of the present invention.

A specific directory (directory called MANIFEST) within an application transfer package 1900 stores the application package definition 1803 to be described below. Further, the application transfer package 1900 stores the plurality of applications 1811 to 1813, the corresponding end user license agreements 1821 to 1823 of the plurality of applications, and corresponding plurality of application transfer data sets 1901 to 1903. The application transfer data will be described hereinafter.

*Application Package Definition 1803

Figure 20:
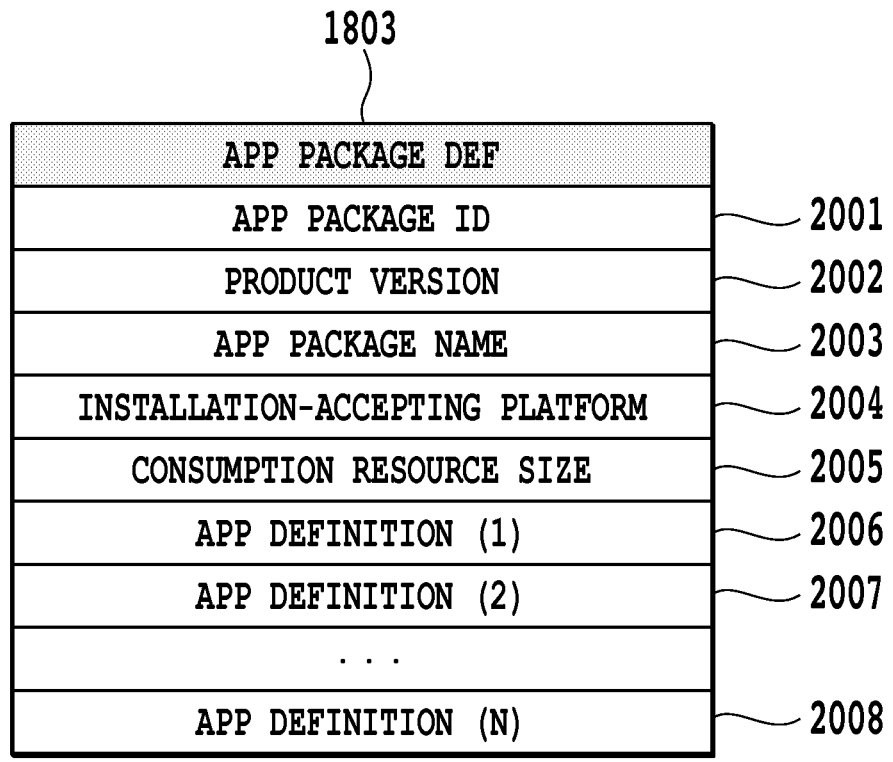
FIG. 20 is a diagram showing a configuration of another application package definition of the present invention.

FIG. 20 shows a configuration of the application package definition according to the present embodiment.

On the drawing, the application package definition 1803 is configured the same as the application package definition 1103 shown in FIG. 12. Different points will be described below.

The application package definition 1803 includes the respective application definitions 1611 of all the applications included in the application package 1800 and the application transfer package 1900 as application definitions 2006 to 2008.

An installation-accepting platform 2004 shows a platform program capable of installing all the applications 1603 included in the application package 1800 and the application transfer package 1900. A consumption resource size 2005 defines a resource size required when all the applications 1603 included in the application package 1800 and the application transfer package 1900 are installed or when the applications are executed after the installation.

*Application Transfer Data

Figure 21:
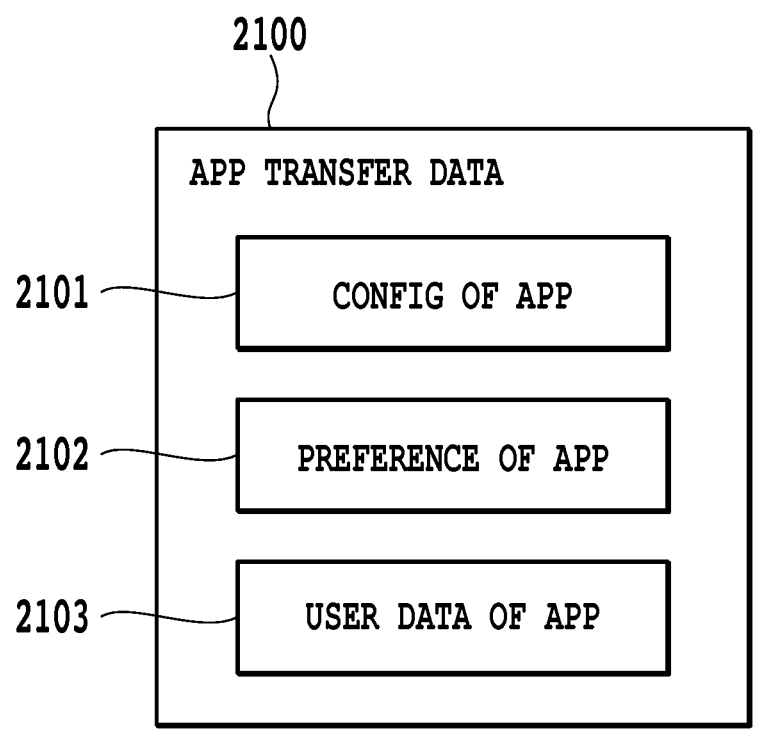
FIG. 21 is a configuration diagram of application transfer data according to the present invention.

FIG. 21 is a block diagram showing a configuration of the application transfer data according to the present embodiment.

An application transfer data 2100 is configured with Config 2101 of the application, Preference 2102 of the application, and User data 2103 of the application. The application transfer data 2100 corresponds to the above described application transfer data 1901 or 1903.

Config 2101 of the application indicates setting information included in each unit of the application 1603. Preference 2102 of the application indicates setting information included in each of the applications 1603 in the unit of a user. User data 2103 of the application indicates data generated and preserved by each of the applications 1603 (e.g., document file preserved by the application 1603).

*Installation Management Table

Figure 22:
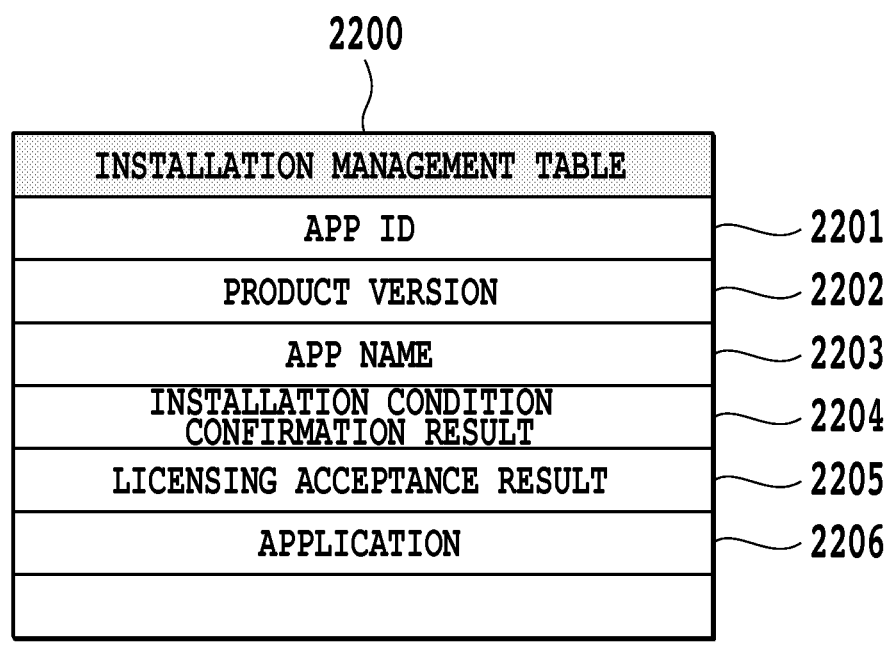
FIG. 22 is a diagram showing a configuration of another installation management table according to the present invention.

FIG. 22 shows a configuration of an installation management table 2200 according to the present embodiment.

The installation management table 2200 used in the installation processing of the platform 13 to be described below includes the same constituents 2201 to 2205 as the constituents 901 to 905 included in the installation management table 900 shown in FIG. 9. Further, the installation management table 2200 includes an application 2206 as a constituent. These are references to each of the applications 1603.

*Application Package Transfer Instruction UI

Figure 23:
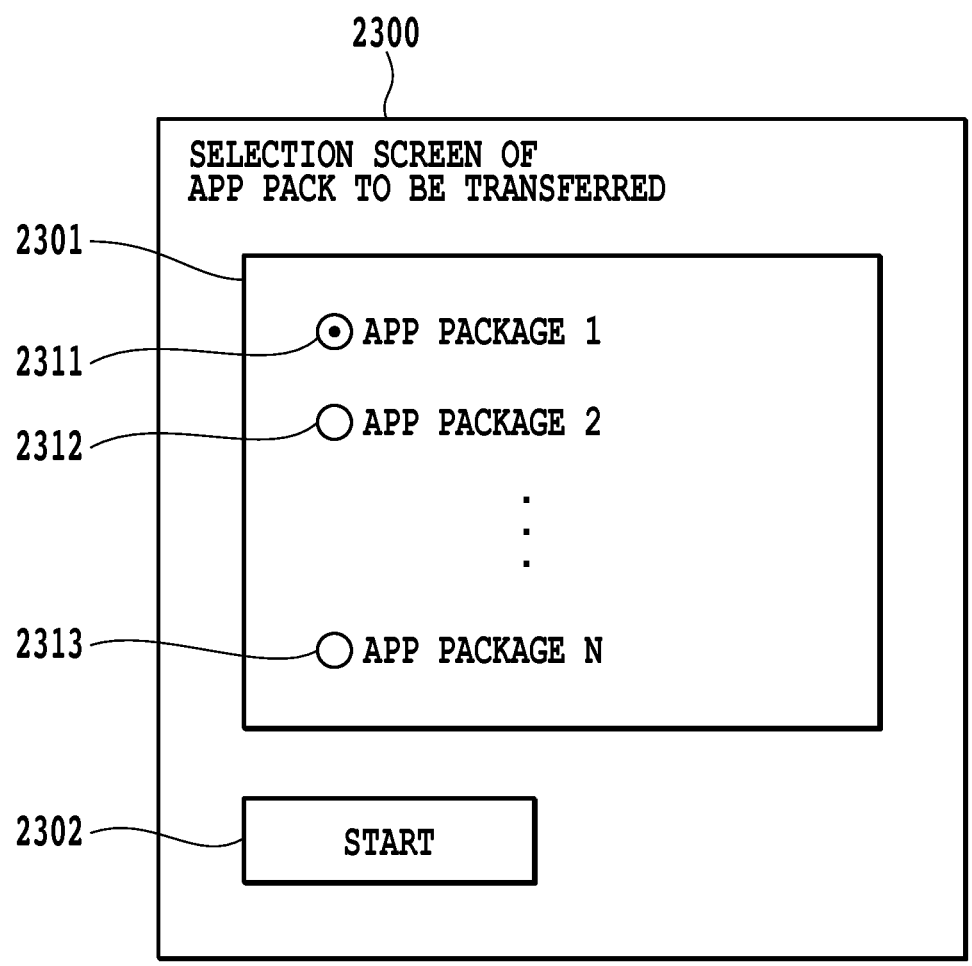
FIG. 23 is a diagram showing an application package transfer instruction UI according to the present invention.

FIG. 23 shows an example of a UI performing a transfer instruction of the application package according to the third embodiment of the present invention.

An application package transfer instruction UI 2300, which is configured with an application package selection region 2301 and an execution button 2302, is displayed on the display of the user I/F 124 and accepts an instruction from a user.

The application package selection region 2301 displays a list of the application packages 2311 to 2313 which are installed in the platform 13. In the application package selection region 2301, the user can select one application package the user wants to transfer.

The execution button 2302 performs a generation instruction of the application transfer package 1900 of the application package selected in the application package selection region 2301 on the platform 13. When the execution button 2302 is operated by the user, the platform 13 starts the generation processing of the application transfer package 1900 corresponding to the application package. This processing will be described below.

*Application Transfer Package Generation Processing

Figure 24:
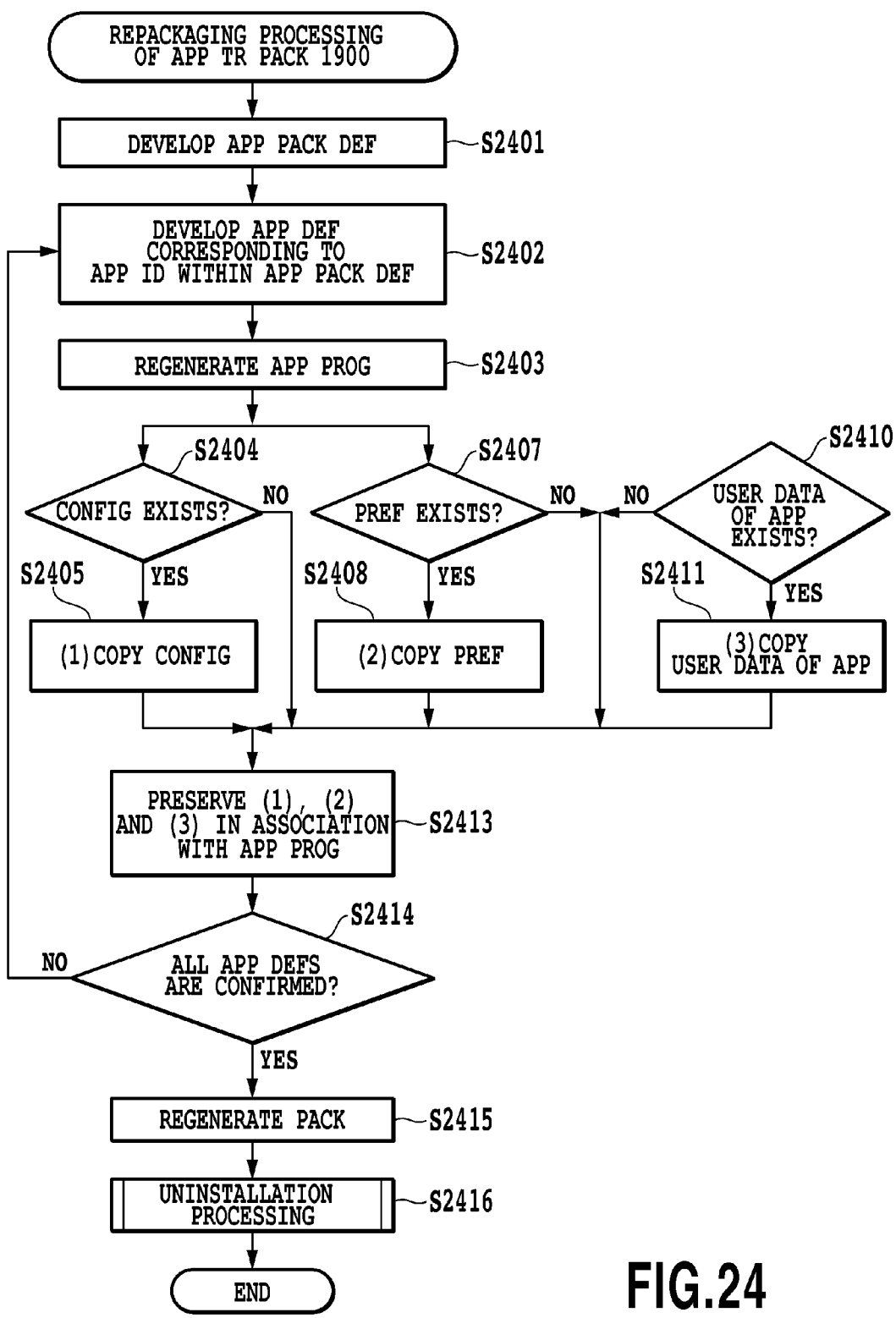
FIG. 24 is a flowchart of re-packaging processing according to the present invention.

The generation processing (re-packaging) of the application transfer package 1900 in the platform 13 will be described by use of a flowchart of FIG. 24.

This processing starts when the platform 13 receives the application transfer package generation instruction from the user (instruction by the execution button 2302) in the application package transfer instruction UI 2300 via the display of the user I/F 124.

The platform 13 receives the application transfer package generation instruction, and obtains and reads out the application package definition 1803 having the corresponding application package ID (S2401).

The platform 13 reads out reference information (application ID) to the application definition 1611 included in the application package definition 1803 read out in Step 2401 (S2402), and reads out the corresponding application definition 1611.

The platform 13 copies the application program 1622 and the end user license agreement 1621 from a location described in the installation path 1746 of the application definition 1611 read out in Step S2402. The platform 13 stores the copied application program 1622 and end user license agreement 1621, and the application definition 1611 read out in Step 2402 into respective directories of the application 1603 as described in FIG. 16. Further, the platform 13 copies the end user license agreement 1621 (S2403). The above processing is the reconfiguration of the application 1603.

The platform 13 determines whether the setting information for each application for the corresponding application 1603 is stored or not in the location described in the installation path 1746 of the application definition read out in Step S2402 (S2404). If the determination result is YES, the platform 13 copies and extracts the setting information for each application of the corresponding application 1603 as Config 2101 of the application (S2405) and proceeds to Step S2413. If the determination result is NO, the platform 13 does not carry out the processing and proceeds to Step S2413.

The platform 13 determines whether the setting information for each user for the corresponding application 1603 is stored in the above location (S2407). If the determination result is YES, the platform 13 copies the setting information for each user (user setting information) of the corresponding application 1603 as Preference 210 of the application (S2408), and proceeds to Step S2413. If the determination result is NO, the platform 13 does not carry out the processing and proceeds to Step S2413.

The platform 13 determines whether or not the data generated and preserved by the corresponding application 1603 is stored in a location described in the data preservation path 1747 of the application definition 1611 read out in Step S2402 (S2410). If the determination result is YES, the platform 13 copies the data generated and preserved by the corresponding application 1603 as User data 2103 of the application (S2411) and proceeds to Step S2413. If the determination result is NO, the platform 13 does not carry out the processing and proceeds to S2413.

In Step S2413, Config 2101, Preference 2102, and User data 2103 of the application copied in respective Steps S2405, S2408 and S2411 are preserved as the application transfer data 2100. The platform 13 carries out this processing associating the copies with the application program. In Step S2413, the platform 13 names the application transfer data 2100 by providing the application ID for retaining the association with the application 1603.

The platform 13 determines whether all the application definitions 1611 corresponding to the respective reference information sets to the application definitions included in the application package definition 1803 read out in Step S2401 have been confirmed or not (S2414). If the determination result is NO, the platform 13 returns to Step S2402 because an unconfirmed application exists.

If the determination result is YES, the platform 13 generates and preserves the application transfer package 1900. The application transfer package 1900 is generated from the application package definition 1803 obtained in Step S2401, the application 1603 and the end user license agreement 1621 regenerated in Step S2403, and the application transfer data 2100 preserved in Step S2413. The application transfer package 1900 can be stored in the indirect storage unit 123 (S2415). Alternatively, the application transfer package 1900 may be preserved in an external storage device such as an external HDD and a USB memory connected via the external interface 125 or in a separated apparatus connected via the network such as a separated host computer and image forming apparatus. The application package definition 1803, regenerated application 1603, the end user license agreement 1621, and the application transfer data 2100 are stored in the respective directories as explained in FIG. 19. The application 1603, the end user license agreement 1621, and the application transfer data 2100 exist, respectively, in the number of the application definitions 1611 which have the respective reference information sets in the application package definition 1803.

The platform 13 uninstalls the application 1603 included in the application package definition 1803 read out in Step S2401 (S2416). This processing means that the platform 13 reads out all the application definitions 1611 which have the respective reference information sets in the application package definition 1803 and deletes the application program and the end user license agreement from the location described in the installation path 1746.

After this processing has been completed, the platform 13 carries out the notification that the application transfer package generation has been completed, via the user interface 124.

*Reinstallation Processing Using the Application Transfer Package

Figure 25B:
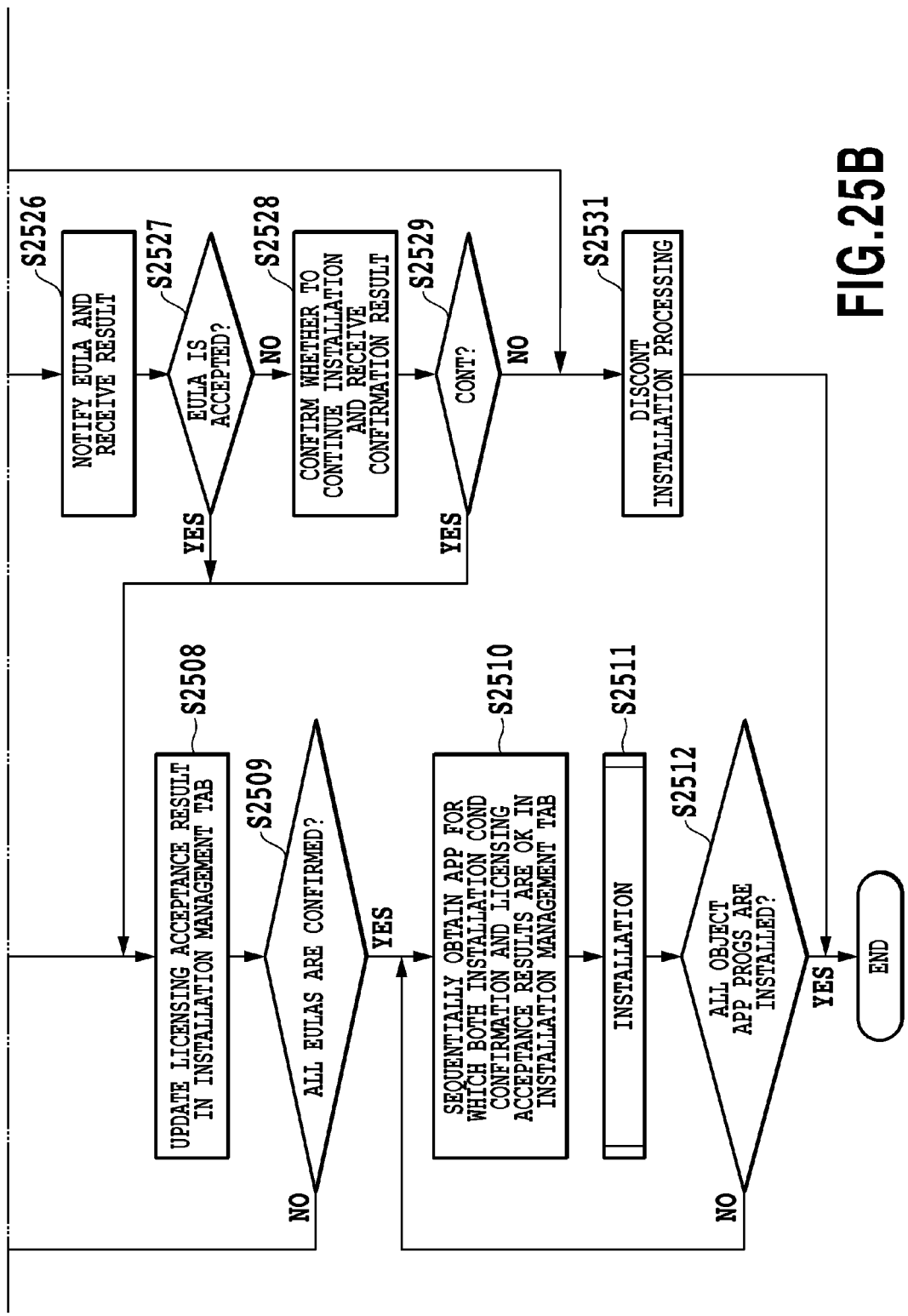

The installation processing of the application transfer package 1900 in the platform 13 will be described by use of a flowchart of FIG. 25.

In the present embodiment, the processing except Step S2531 is the installation processing of the application transfer package, and Step S1511 in the processing performs the installation of the application program. That is, the application program installation is carried out during the installation processing of the application transfer package.

The platform 13 obtains the application transfer package 1900 to be installed from the external interface 125 (S2501).

Next, the platform 13 carries out the following processing in Step S2502. The platform 13 obtains the application package definition 1803 included in the obtained application transfer package 1900, and generates the installation management table 2200 using information of the obtained application package definition 1803. Specifically, the platform 13 generates the installation management table 2200 storing information except the installation condition confirmation result 2204 and the licensing acceptance result 2205 of the installation management table 2200 (information of the application definition 1611).

Next, the platform 13 carries out package installation condition confirmation to be described below using the information of the application package definition 1803 (S2503). Then, if the confirmation result shows that the installation is possible, the platform 13 updates the installation condition confirmation result 2204 for all the applications of the installation management table 2200 with information indicating that the installation is possible (S2504 and S2517). Further, if even one application is not installable in the installation condition confirmation result, the platform notifies the external interface 125 about that the installation is not possible and requests an instruction from the user via the external I/F 125 (S2517 and S2518). Then, the platform 13 confirms the instruction from the user via the external interface 125 (confirms whether to continue the installation without change) (S2518). If the instruction is to continue the installation in the result, the platform 13 updates the installation condition confirmation result 2204 for the uninstallable application in the installation management table 2200 with information indicating that the installation is not possible (S2519 and S2504). Obviously, if there exists the application which is installable in the installation condition confirmation result, the platform 13 updates the installation condition confirmation result 2204 for the application with information indicating that the installation is possible (S2504). Further, if the instruction is not to continue the installation, the platform 13 discontinues the installation processing (S2531).

Next, the platform 13 carries out the processing only for the application which has the information indicating that the installation is possible in the installation condition confirmation result 2204, among the applications registered in the generated installation management table 2200 (S2505).

The platform 13 confirms whether or not the application transfer package 1900 has the replica of the end user license agreement 1621 of the application 1603 to be installed outside the application 1603 to be installed (S2506 and S2507).

Depending on the above confirmation result, the platform 13 carries out processing of Step S2526 and the subsequent steps the same as the processing of Step S1026 and the subsequent steps shown in FIG. 10, or carries out the processing of Step 2508 and the subsequent steps the same as the processing of Step 1010 and the subsequent steps. Note that the platform 13 does not carry out the application decryption processing (Step S1013). The application program installation in Step S1511 included in the latter processing is carried out the same as the application program installation in Step S1014 shown in FIG. 10.

*Package Installation Condition Confirmation Method

A method of the package installation condition confirmation in the installation processing of the platform 13 will be described.

The platform 13 confirms the installation condition by directly comparing the information defined in the application package definition 1803 and the device information (platform 13 and image processing device 12). The platform 13 carries out determination as described in the installation condition confirmation method in the first embodiment, by using particularly the installation-accepting platform 1744 and the consumption resource size 1745 in the information defined in the application definition 1611. That is, the platform 13 determines whether the installation is possible or not by judging whether the platform program is provided with a platform version which can install the application, and whether the device is provided with a resource to be consumed by the application as a remaining resource. Further, the platform 13 determines whether the installation is possible or not by judging whether the device has an ID specific to a device which can install the application and whether the device has a device function which can install the application.

Further, in the present embodiment, when having determined that it is not possible to install all the applications 1603 included in the application transfer package 1900, the platform 13 subsequently determines whether the installation is possible or not individually for each application included in the application transfer package 1900, using the individual application definition 1611 included in the application package definition 1803.

The present embodiment achieves generation of an application transfer package which is capable of easily recreating an original use environment, that is, an environment including an application setting and user data (reinstalling) for a plurality of applications. Thereby, it becomes possible to carry out jobs such as installation condition confirmation, license confirmation, and acceptance of a license agreement for all applications at a time at a start of the installation processing. Further, an improvement in a performance of the installation condition confirmation is brought out by using an application package definition. Thereby, it is possible to prevent that input jobs such as the acceptance of an end user license agreement and an instruction to continue the installation processing are required during the installation processing and the installation processing becomes complicated.

(Fourth Embodiment)

The present embodiment uses the same symbol for the same configuration and constituent as those of the third embodiment, and description thereof will be omitted appropriately and a different point will be described in detail.

Figure 27:
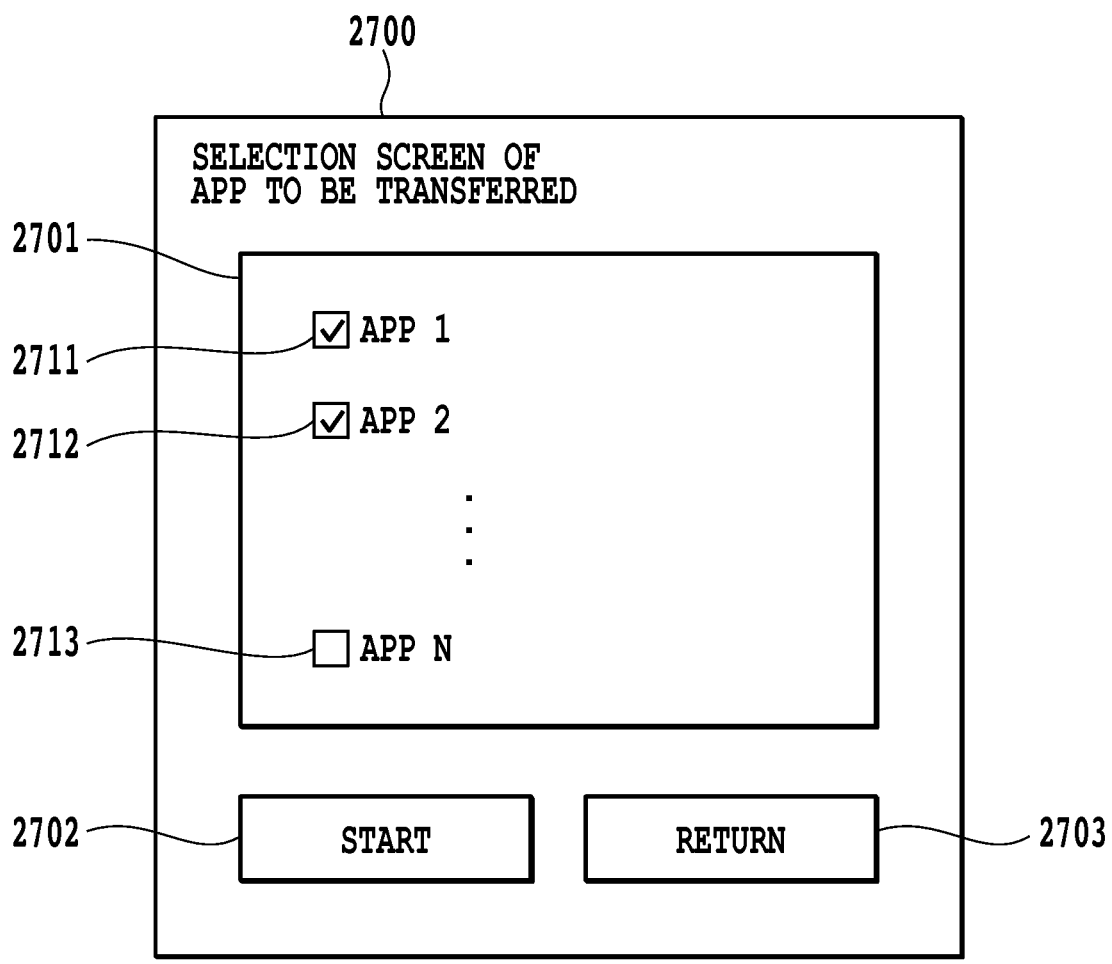
FIG. 27 is a diagram showing an application selection UI according to the present invention.

The different point is that the application transfer package in the present embodiment can select the application (FIG. 27). That is, the third embodiment generates the application transfer package 1900 in the selection by the application package installed in the platform 13 and does not select the application within the application package.

Further, the present embodiment is different in that the application is included in the application transfer package 1900 when the environment of a location preserving the application transfer package 1900 is a platform which can install the application.

Further, the present embodiment performs the operation (logical product operation, logical sum operation, or summation operation) depending on the kind of the information in the application definition the same as the second embodiment, when generating the application transfer package including the application package definition. Such an operation is not carried out in the third embodiment which replicates the installed application package definition without change.

*Application Package Transfer Selection UI

Figure 26:
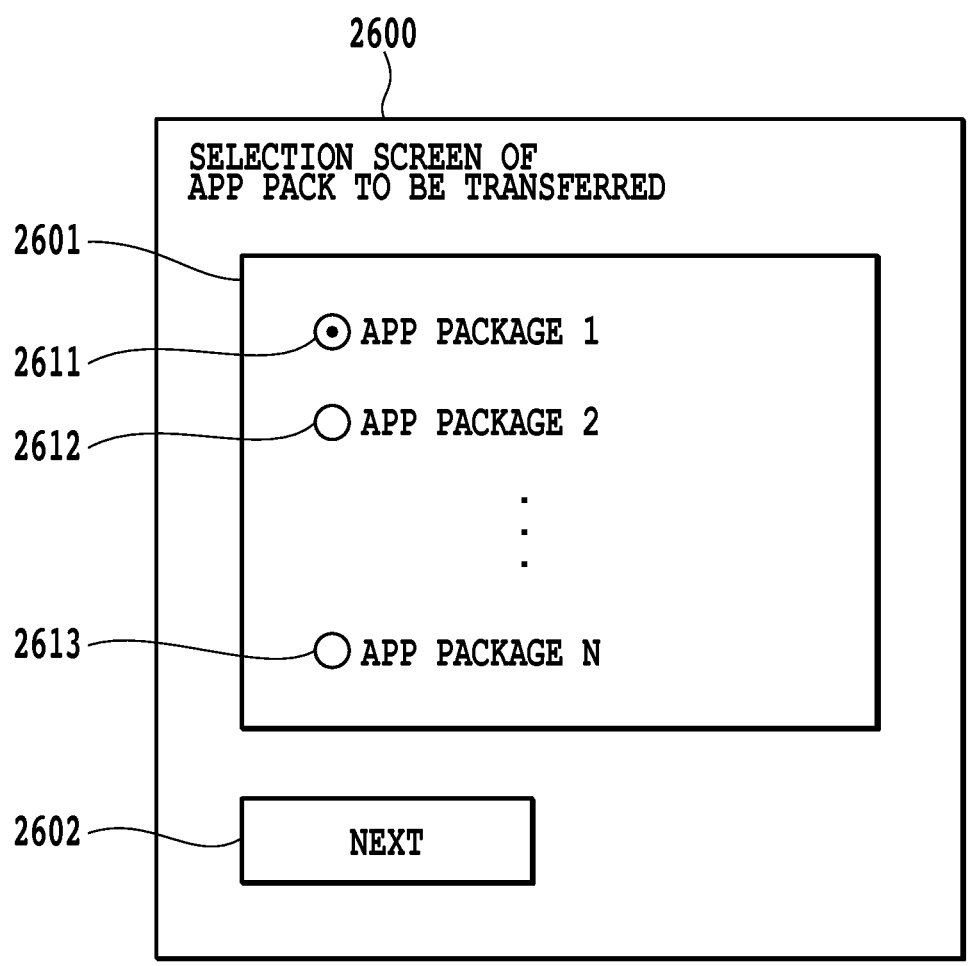
FIG. 26 is a diagram showing an application package transfer selection UI according to the present invention.

FIG. 26 shows an example of a UI performing transfer selection of the application package according to the present embodiment.

An application package transfer selection UI 1200, which is configured with an application package selection region 2601 and a transition button 2602, is displayed on the display of the user I/F 124 and accepts an instruction from a user.

The application package selection region 2601 displays a list of the application packages 2611 to 2613 installed in the platform 13. In the application package selection region 2601, the user can select one application package the user wants to transfer.

The transition button 2602 causes the display to transit to an application selection UI 2700 (FIG. 27) in which the user selects which application is to be transferred in the application package selected in the application package selection region 2601. The application selection UI will be described in the following.

*Application Selection UI

FIG. 27 shows an example of a UI performing the application transfer selection and a generation instruction of the application transfer package.

The application selection UI 2700, which is configured with an application selection region 2701, an execution button 2702, and a return button 2703, is displayed on the display of the user I/F 124 and accepts an instruction from the user.

The application selection region 2701 displays lists 2711 to 2713 of the applications included in the application package selected in the application package selection region 2601 of the application package transfer selection UI 2600. That is, when the application package (1) has been selected in the application package transfer selection UI 2600 and the display transits to the application selection UI 2700, the application selection region 2701 displays a list of the applications included in the application package (1). Further, in the application selection region 2701, the user can select a plurality of applications the user wants to transfer.

The execution button 2702 is a button for the user to perform the generation instruction of the application transfer package 1900 on the platform 13. When the execution button 2702 is pushed down by the user, the platform 13 starts the generation processing of the application transfer package 1900 corresponding to the selected application. This processing will be described below.

When the user pushes down the return button 2703, the platform 13 erases the application selection UI 2700 from the display of the user interface 124 and returns to the display of the application package transfer selection UI 2600.

Figure 28B:
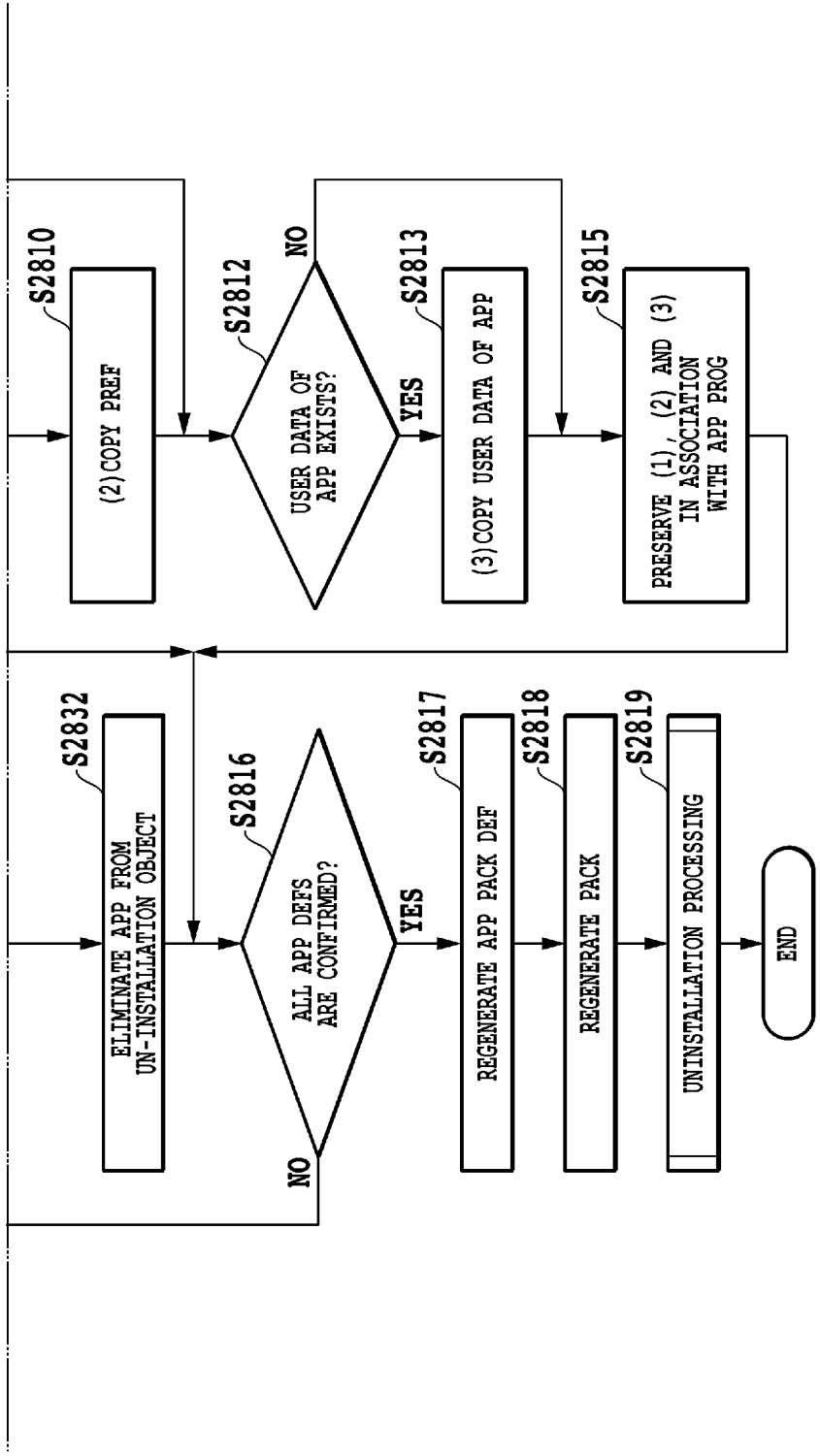

*Application Transfer Package Generation Processing by the Application Selection The generation processing (repackaging) of the application transfer package 1900 in the platform 13 will be described by use of a flowchart of FIG. 28.

This processing starts when the platform 13 receives an application transfer package generation instruction from the user (instruction by the execution button 2702) in the above application selection UI 2700, via the display of the user I/F 124. The instruction information received by the platform 13 includes the application package ID and the application ID selected in the application selection UI 2700. The application transfer package generation starts using this information.

The platform 13 receives the application transfer package generation instruction and obtains the application package definition 1803 corresponding to the application package ID. Further, the platform 13 obtains all the application definitions 1611, each of which has the application ID corresponding to the selected application, from the respective reference information sets to the application definitions in the obtained application package definition 1803, and generates a list of the application definitions 1611 (S2801).

The platform 13 reads out one application definition from the list of the application definitions 1611 obtained in Step S2801 (S2802).

The platform 13 confirms whether a location to preserve the application transfer package 1900 is the image forming apparatus or not. Specifically, the platform 13 determines whether or not the location is a separated image forming apparatus connected via the external interface 125 (S2803). If the determination result is NO, the platform 13 assumes that the preservation location is not only the indirect storage unit 123 but also an external storage device such as an external HDD and a USB memory connected via the external interface 125, and proceeds to Step S2805. If the determination result is YES, the platform 13 assumes that the location is the separated image forming apparatus, and determines whether the separated image forming apparatus is a platform which can install the application or not. That is, the platform 13 compares the information of the installation-accepting platform 1744 in the application definition 1611 read out in Step S2802 with the platform information (version or the like) of the preservation location and determines whether both of the information sets meet each other or not (S2804). If the determination result is YES, the platform 13 assumes that the application can be installed at the preservation location and proceeds to Step S2805. If the determination result is NO, the platform 13 assumes that the application cannot be installed at the preservation location, and confirms it with the user via the user I/F 124 whether or not to leave the application without uninstalling it from the platform 13 (S2831). If the application is not to be uninstalled in the confirmation result (YES), the platform 13 deletes the corresponding application definition (application ID) from the application definition list generated in Step S2801 (S2832). The reason for deleting the application ID is that the application is not to be uninstalled from the platform 13. The platform 13 eliminates the application from the uninstallation object and then proceeds to Step 2816. On the other hand, when the application is to be uninstalled in the confirmation result (NO), the platform 13 does not carry out the processing and proceeds to Step S2816.

If the determination is NO in Step S2803, or if the determination is YES in Step S2804, the platform 13 regenerates the application 1603 in Step S2805. That is, the platform 13 copies the application program 1622 and the end user license agreement 1621 at the location described in the installation path 1746 of the application definition 1611 read out in Step S2802. The platform 13 stores the copied application program 1622 and end user license agreement 1621 and the application definition 1611 read out in Step S2802 in the respective directories of the application 1603 as explained in FIG. 16. Further, the platform 13 copies the end user license agreement 1621 when having assumed that the external storage device such as the external HDD or the USB memory is the preservation location and when having assumed that the application can be installed at the preservation location.

The platform 13 determines whether the setting information for each application for the corresponding application 1603 is stored or not at the location described in the installation path 1746 of the application definition read out in Step S2802 (S2806). If the determination result is YES, the platform 13 copies the setting information for each application of the corresponding application 1603 as Config 2101 of the application (S2807), and proceeds to Step S2809. If the determination result is NO, the platform 13 does not carry out the processing and proceeds to Step S2809.

In Step S2809, the platform 13 determines whether the setting information for each user for the corresponding application 1603 is stored or not at the location described in the installation path 1746 of the application definition 1611 read out in Step S2802. If the determination result is YES, the platform 13 copies the setting information for each user of the corresponding application 1603 as Preference 2102 of the application (S2810), and proceeds to Step S2812. If the determination result is NO, the platform 13 does not carry out the processing and proceeds to Step S2812.

In Step S2812, the platform 13 determines whether data generated and preserved by the corresponding application 1603 is stored or not at the location described in the data preservation path 1747 of the application definition 1611 read out in Step S2802. If the determination result is YES, the platform 13 copies the data generated and preserved by the corresponding application 1603 as User data 2103 of the application (S2813), and proceeds to Step S2815. If the determination result is NO, the platform 13 does not carry out the processing and proceeds to Step S2815.

In Step S2815, Config 2101, Preference 2102, and User data 2103 of the application copied in Steps S2807, S2810 and S2813, respectively, are preserved as the application transfer data 2100. The platform 13 performs this processing associating the copies with the application program. In Step S2815, the platform 13 names the application transfer data 2100 by providing the application ID for retaining the association with the application 1603.

In Step S2816, subsequently to Step S2815 or S2832, or if the determination result is NO in Step 2831, the platform 13 determines whether or not all the application definitions 1611 listed in Step S2801 have been confirmed. If the determination result is NO, the unconfirmed application exists and the process returns to Step S2802.

If the determination result is YES, the platform 13 generates the application package definition 1803 of the application transfer package 1900 to be generated in the present processing (S2817). The platform 13 generates the application package definition 1803 by logically or arithmetically combining the respective information sets defined in the application definitions 1611 to be included in the application transfer package 1900. In the information defined in the application definition 1611, the platform 13 logically or arithmetically combines particularly the respective information sets of the installation-accepting platform 1744 and the consumption resource size 1745. A specific method of the logical or arithmetical combining for generating the application package definition 1803 may be the same as the method described in the generation method of the application package definition 1103 in the second embodiment.

The platform 13 generates the application transfer package 1900 and stores it at the location confirmed in Step S2803 (S2818). The package 1900 is generated from the application package definition 1803 generated in Step S2817, the application 1603 regenerated in Step S2805, the end user license agreement 1621, and the application transfer data 2100 preserved in Step S2815. The application package definition 1803, the regenerated application 1603, the end user license agreement 1621, and the application transfer data 2100 are stored into respective directories as explained in FIG. 19. Each of the application 1603, the end user license agreement 1621, and the application transfer data 2100 exists in the number of application definitions 1611 which have the respective reference information sets in the application package definition 1803.

The platform 13 uninstalls the application 1603 included in the list of the application definitions listed in Step S2801 (S2819). Note that the application which has been determined not to be uninstalled is not uninstalled here because this application has been deleted from the list in Step S2832. This processing means that the platform 13 reads out all the application definitions 1611 included in the list of the application definitions listed in Step S2801 and deletes the application programs and the end user license agreements from the location described in the installation path 1746.

The present embodiment achieves generation of an application transfer package which is capable of easily recreating an original use environment, that is, an environment including an application setting and user data (reinstallation) for a plurality of applications selected by a user. Thereby, it becomes possible to carry out jobs such as installation condition confirmation, license confirmation, and acceptance of a license agreement for all applications at a time at a start of the installation processing. Further, an improvement in a performance of the installation condition confirmation is brought out by using an application package definition. Thereby, it is possible to prevent that input jobs such as the acceptance of an end user license agreement and an instruction to continue the installation processing are required during the installation processing and the installation processing becomes complicated.

Note that the present specification describes the end user license agreement and the application definition as examples of "data which resultantly requires a user's instruction via an interface in the installation of an application program within an application". However, these are only examples. Not limited to these examples, each of the accompanying flowcharts may be applied to other "data which resultantly requires a user's instruction via an interface in the installation of an application program within an application".

The end user license agreement is data for requesting user's acceptance via an interface before the installation of an application program within an application. Accordingly, the end user license agreement can be said to be "data which resultantly requires a user's instruction via an interface in the installation of an application program within an application".

Further, the application definition is used for determination whether installation is possible or not in an installation condition confirmation result. When the installation is not possible in this determination result, a user's instruction is requested via an interface (S1018, S1518 or S2518). Accordingly, the application definition is data necessary for determining whether the user's instruction is to be requested or not via an interface in the installation of an application program within an application. Accordingly, the application definition also can be said to be "data which resultantly requires a user's instruction via an interface in the installation of an application program within an application".

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-068163, filed Mar. 19, 2009, which is hereby incorporated by reference herein in its entirety.

What is claimed is:

1. A system comprising a first device on which a plurality of applications have been installed and a second device on which the plurality of applications are to be installed, wherein
   the first device on which the plurality of applications have been installed comprises:
   a first processor and a first memory storing code of a program that when executed by the first processor, executes:

extracting an end user license agreement for each of the plurality of applications and document files which have been produced using each of the plurality of applications in response to instructions given by a user, in response to an instruction to transfer the plurality of applications to the second device; and associating the plurality of applications with the plurality of extracted end user license agreements and the document files which have been produced using each of the plurality of applications to be transmitted to the second device on which the plurality of applications are to be installed, and wherein, the second device on which the plurality of applications are to be installed comprises:

a second processor and a second memory storing code of a program that when executed by the second processor, executes:

receiving the plurality of applications, the plurality of extracted end user license agreements and the document files that have been associated with each other by the associating step of the first device;

notifying a user of the plurality of received end user license agreements; and installing the plurality of received applications and storing the document files associated with the plurality of installed applications in the second device in response to an acquisition of an acceptance of the plurality of notified end user license agreements from the user.

2. A method executed in a system comprising a first device on which a plurality of applications have been installed and a second device on which the plurality of applications are to be installed, wherein the method comprises:

in the first device on which the plurality of applications have been installed:

extracting an end user license agreement for each of the plurality of applications and document files which have been produced using each of the plurality of applications in response to instructions given by a user, in response to an instruction to transfer the plurality of applications to the second device; and associating the plurality of applications with the plurality of extracted end user license agreements and the document files which have been produced using each of the plurality of applications to be transmitted to the second device on which the plurality of applications are to be installed; and in the second device on which the plurality of applications are to be installed:

receiving the plurality of applications, the plurality of extracted end user license agreements and the document files that have been associated with each other by the associating step in the first device;

notifying a user of the plurality of received end user license agreements; and installing the plurality of received applications and storing the document files associated with the plurality of installed applications in the second device in response to acquiring an acceptance of the plurality of notified end user license agreements from the user.

3. A non-transitory computer readable storage medium on which is stored computer executable code of a program that, when executed by at least one computer processor, causes a system comprising a first device on which a plurality of applications have been installed and a second device on which the plurality of applications are to be installed, to perform a process comprising:

in the first device on which the plurality of applications have been installed:

extracting an end user license agreement for each of the plurality of applications and document files which have been produced using each of the plurality of applications in response to instructions given by a user, in response to an instruction to transfer the plurality of applications to the second device; and associating the plurality of applications with the plurality of extracted end user license agreements and the document files which have been produced using each of the plurality of applications to be transmitted to the second device on which the plurality of applications are to be installed; and in the second device on which the plurality of applications are to be installed:

receiving the plurality of applications, the plurality of extracted end user license agreements and the document files that have been associated with each other by the associating step in the first device;

notifying a user of the plurality of received end user license agreements; and installing the plurality of received applications and storing the document files associated with the plurality of installed applications in the second device in response to acquiring an acceptance of the plurality of notified end user license agreements from the user.

* * * * *